United States Patent
Behm et al.

(10) Patent No.: US 12,267,457 B2
(45) Date of Patent: *Apr. 1, 2025

(54) METHOD AND SYSTEM TO ENHANCE COMMUNICATION BETWEEN MULTIPLE PARTIES

(71) Applicants: Gary Behm, West Henrietta, NY (US); Brian Trager, West Henrietta, NY (US); Shareef Ali, Rochester, NY (US); Mark Jeremy, Penfield, NY (US); Byron Behm, Rochester, NY (US)

(72) Inventors: Gary Behm, West Henrietta, NY (US); Brian Trager, West Henrietta, NY (US); Shareef Ali, Rochester, NY (US); Mark Jeremy, Penfield, NY (US); Byron Behm, Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,026

(22) Filed: Apr. 19, 2021

(65) Prior Publication Data
US 2021/0243298 A1    Aug. 5, 2021

Related U.S. Application Data

(63) Continuation of application No. 16/791,721, filed on Feb. 14, 2020, now Pat. No. 11,012,559.
(Continued)

(51) Int. Cl.
*H04M 3/42*    (2006.01)
*H04M 1/72475*    (2021.01)
*H04M 3/58*    (2006.01)

(52) U.S. Cl.
CPC ... *H04M 3/42391* (2013.01); *H04M 1/72475* (2021.01); *H04M 3/58* (2013.01)

(58) Field of Classification Search
CPC ......... H04M 3/42391; H04M 1/72475; H04M 3/58; H04M 3/56; H04M 2201/50
See application file for complete search history.

(56) References Cited

U.S. PATENT DOCUMENTS 7,809,121 B2    10/2010    Gruchala et al.
8,204,179 B2    6/2012    Goldman et al.
(Continued)

OTHER PUBLICATIONS

Astrom, L., et al., Real-time text Interoperability, Gallaudet University, Omnitor, and University of Wisconsin—Madison, Dec. 17, 2015; https://ecfsapi.fcc.gov/file/60001388386.pdf.
(Continued)

*Primary Examiner* — Phung-Hoang J Nguyen
(74) *Attorney, Agent, or Firm* — Bond, Schoeneck & King, PLLC; Joseph M. Noto

(57) ABSTRACT

A system and method for enhancing communication between multiple parties includes a first user accessing a communication device; initiating a communication connection to a receiving communication device of a second user; and wherein at least one of the communication devices includes a list of enabled universal communication attributes of the user, utilizing one or more of the enabled communication attributes to complete the communication connection between the initiating and receiving communication devices. A user can select a desired communication attribute or multiple attributes which can be stored in the user's profile. The enabled attributes can be utilized by a network accessing the user's profile to complete the communication connection.

14 Claims, 21 Drawing Sheets

Related U.S. Application Data

(60) Provisional application No. 62/805,486, filed on Feb. 14, 2019.

(56) References Cited

U.S. PATENT DOCUMENTS

| | | | |
|---|---|---|---|
| 9,015,297 | B2 | 4/2015 | Putman et al. |
| 9,100,474 | B2 | 8/2015 | Cha et al. |
| 9,324,324 | B2 | 4/2016 | Knighton |
| 9,549,060 | B2 | 1/2017 | Wohlert et al. |
| 9,578,284 | B2 | 2/2017 | Walker et al. |
| 9,622,052 | B1 | 4/2017 | Pan |
| 9,654,628 | B2 | 5/2017 | Warren et al. |
| 9,736,083 | B2 | 8/2017 | Wang et al. |
| 9,787,726 | B2 | 10/2017 | Russell et al. |
| 9,787,941 | B1 | 10/2017 | Brooksby et al. |
| 9,942,514 | B1 | 4/2018 | Panwar et al. |
| 10,084,910 | B2 | 9/2018 | Montero et al. |
| 10,098,044 | B2 | 10/2018 | Jeong et al. |
| 10,192,554 | B1 | 1/2019 | Boehme et al. |
| 10,194,320 | B1 | 1/2019 | Egner et al. |
| 10,194,479 | B2 | 1/2019 | Naqvi et al. |
| 10,194,487 | B2 | 1/2019 | Engelhart, Sr. |
| 10,320,975 | B2 | 6/2019 | Hamling et al. |
| 10,423,237 | B2 | 9/2019 | Episkopos et al. |
| 10,531,041 | B2 | 1/2020 | Talbot |
| 2006/0026001 | A1* | 2/2006 | Bravin .................. G09B 21/009 704/270.1 |
| 2006/0285652 | A1* | 12/2006 | McClelland ...... H04M 3/42391 379/52 |
| 2008/0260210 | A1 | 10/2008 | Kobeli et al. |
| 2012/0269331 | A1 | 10/2012 | Harris et al. |
| 2018/0013885 | A1 | 6/2018 | Montero et al. |
| 2018/0199006 | A1* | 7/2018 | Brooksby ............ A61B 5/0022 |

OTHER PUBLICATIONS

International Telecommunication Union; Multimedia telecommunication relay services: Recommendation ITU-T F.930, Mar. 2018; https://www.itu.int/rec/dologin_pub.asp?lang=e&id=T-REC-F.930-201803-I!!PDF-E&type=items.

Paredes, H., et al, "SOSPhone: a mobile application for emergency calls," Universal Access Information Society , vol. 13, Aug. 2014, https://www.academia.edu/7829419/SOSPhone_a_mobile_application_for_emergency_calls.

Emergency Access Advisory Committee (EAAC) Report and Recommendations, Dec. 2011; https://docs.fcc.gov/public/attachments/DOC-312161A1.pdf ; 70 pages.

IMS Core Manual Version 15.3.0, ETSI TS 123 501 v15.3.0; https://www.etsi.org/deliver/etsi_ts/123500_123599/123501/15.03.00_60/ts_123501v150300p.pdf; Sep. 2018.

Implementing IMS; https://source.android.com/devices/tech/connect/ims; Jan. 21, 2020.

Implementing Real-Time Text; https://source.android.com/devices/tech/connect/rtt; Jan. 6, 2020.

* cited by examiner

Communication Attribute Hierarchy Structure

| Service Category | Service Type | Provider Type | Provider Identifier | Features |
|---|---|---|---|---|
| Telecommunications Relay Service (TRS) | | | | |
| | Video Relay Service (VRS) | | | |
| | | VRS Provider Name (1 to N) | | |
| | | | VRS Identifier (1 to N) | Voice Carry Over (VCO) |
| | | | | 3-way video |
| | | | | Text Message |
| | Internet Protocol Captioned Telephone Service (IP CTS) | | | |
| | | Caption Provider Name (1-N) | | |
| | | | CTS Identifier (1 to N) | Video Enabled |
| | | Automatic Speech Recognition provider (1-N) | | Text |
| | | | ASR Identifier (1 to N) | Video Enabled |
| | Braille Options | | | |
| | | Manufacturer (Model) | Model # | Printer – on/off |
| Multiple Languages | | | | |
| | Service Provider Name (1-N) | | | |
| | | Service Provider Identifier (1-N) | | |

FIG. 4

METHOD AND SYSTEM TO ENHANCE COMMUNICATION BETWEEN MULTIPLE PARTIES

CROSS REFERENCE

This application is a continuing application of U.S. Non-Provisional application Ser. No. 16/791,721 filed Feb. 14, 2020, which claims the benefit of the filing date of U.S. Provisional Patent Application Ser. No. 62/805,486 filed Feb. 14, 2019, which is hereby incorporated by reference in its entirety.

FIELD

This disclosure relates to a system and method for enhanced communication between multiple parties, and in particular to a system and method for enhanced communication employing seamless methods which can use multiple components across several different types of networks.

BACKGROUND

Current smartphone technology and features have made improvements in its capabilities of providing improved access to accessibility services but are underutilized, have significant limitations, and require additional modification and development to reach full potential. A deaf or hard of hearing individual requiring telecommunications relay services is often limited to specific hardware or installed software on the device in order to connect to service providers. TRS refers to all forms of telecommunications relay service in which an individual with a hearing or speech disability uses an Internet connection with the TRS communications assistant (CA). If a deaf or hard of hearing person needed to place an emergency call from a mobile phone, there is no support for connecting to TRS services without using a $3^{rd}$ party app.

Deaf and hard of hearing users have been limited to only to the type of service (for example, videophones only access Video Relay Services (VRS), not Internet Protocol Captioned Telephone Services (IP-CTS) captioned based services or real-time text services. Deaf and hard of hearing users have had specific equipment, multiple identifiers (phone numbers), limited choices for service providers, limited interoperability between providers due to certain feature restrictions (such as phone book/contact lists, video call codecs, voice/video-mail), and limited access to emergency services because software does not often have system level GPS/E911 access.

Individuals who are deaf or hard of hearing require registration into the Internet Telecommunications Relay Service database (iTRS). Since most carriers/network infrastructures do not have access to the iTRS database, and do not have enhanced call flow logic, current networks have not been able to provide the accessibility needs for individuals with disabilities.

These problems have been solved in the past by keeping each issue isolated to a particular provider, device, methods and software application. For example, the interoperability issues between two VRS providers requires two customized end-point solutions. In addition, for the individual desiring accommodation, there are multiple steps needed to access these services, duplicate accounts across a variety of providers, settling for lack of features due to serious restrictions of a "service provider" pushing technology solutions that are inherently proprietary.

The art lacks systems and methods that can be used to improve accessibility across all phone devices by allowing each device to become accessible for deaf, hard of hearing, deaf-blind, blind users.

SUMMARY

In accordance with one aspect of the present invention, there is provided a method for enhancing communication between multiple parties, including: accessing by a first user an initiating communication device; initiating by the first user a communication connection to a receiving communication device of a second user; and a) wherein the initiating communication device includes a list of universal communication attributes that are enabled in the user's profile; utilizing one or more of the enabled communication attributes of the first user to complete the communication connection between the initiating and receiving communication devices; b) wherein the receiving communication device includes a list of universal communication attributes that are enabled in the second user's profile; utilizing one or more of the enabled communication attributes of the second user to complete the communication connection between the initiating and receiving communication devices; or c) wherein both the initiating and receiving devices include a list of universal communication attributes that are enabled in the first and second user's profile; utilizing one or more of the enabled communication attributes of the first and second user to complete the communication connection between the initiating and receiving communication devices.

In accordance with another aspect of the present disclosure, there is provided a communication system for multiple parties, including: at least two communication devices, wherein at least one of the at least two communication devices including a user's profile including a list of enabled communication attributes; an assistive communication provider, including access to a plurality of assistive communication services; and at least one network including access to the assistive communication provider and the enabled communication attributes of the at least two communication devices.

In accordance with another aspect of the present disclosure, there is provided a method for enhancing communication between multiple parties including a first user accessing a communication device; initiating a communication connection to a receiving communication device of a second user; and wherein at least one of the communication devices includes a list of enabled universal communication attributes of the user, utilizing one or more of the enabled communication attributes to complete the communication connection between the initiating and receiving communication devices.

These and other aspects of the present disclosure will become apparent upon a review of the following detailed description and the claims appended thereto.

BRIEF DESCRIPTION OF THE DRAWINGS

FIG. 4 illustrates an example of a hierarchy structure of communication attributes;

DETAILED DESCRIPTION

Figure 1:
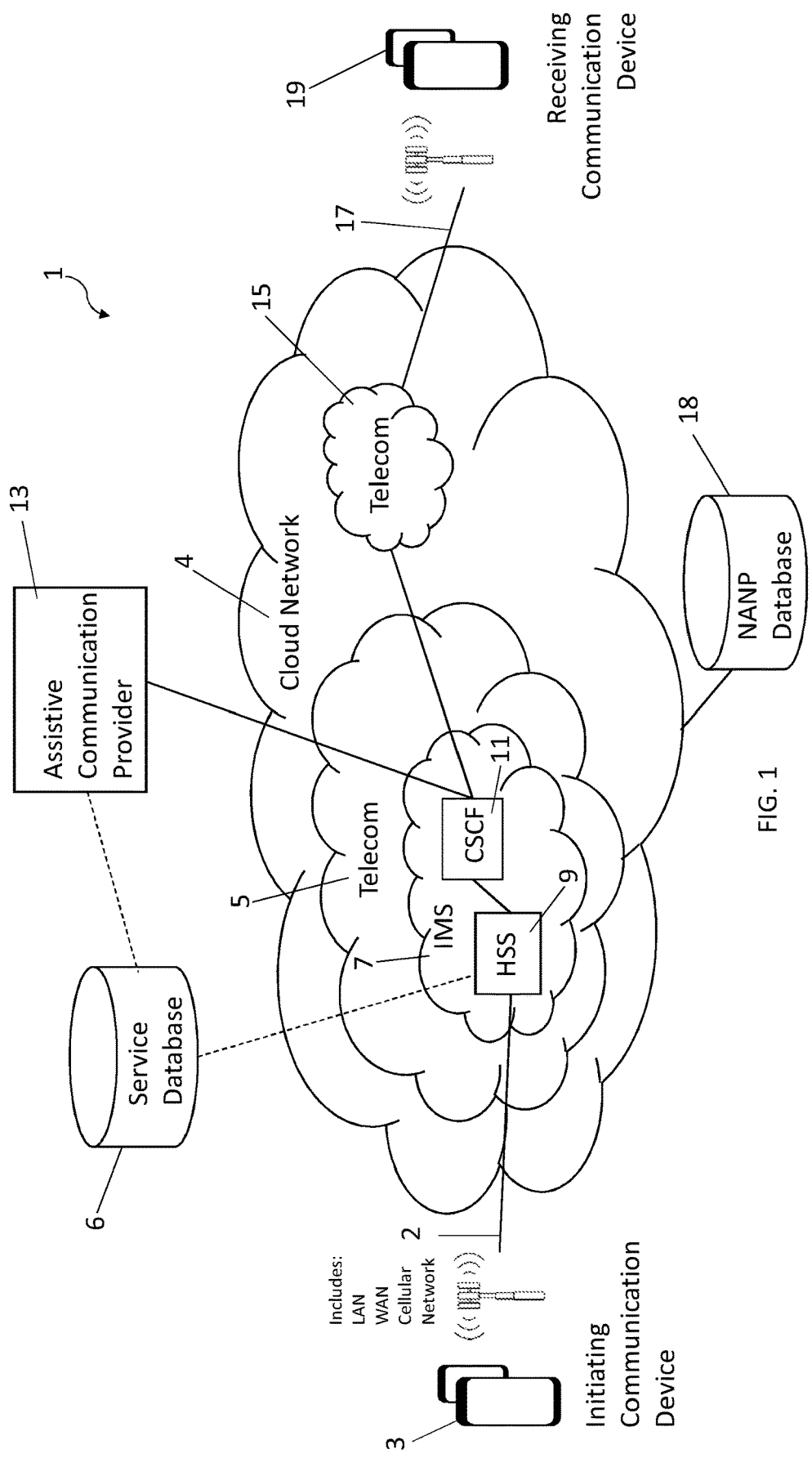
FIG. 1 illustrates an overview of a system with a telecom network in accordance with an embodiment of the present disclosure.

A system and method for enhancing communication between multiple parties, includes a first user accessing a communication device; initiating a communication connection to a receiving communication device of a second user; and when the initiating communication device includes a list of enabled universal communication attributes of the user; utilizing one or more of the enabled communication attributes to complete the communication connection between the initiating and receiving communication devices; when the receiving communication device includes a list of enabled universal communication attributes of the second user; utilizing one or more of the enabled communication attributes of the second user to complete the communication connection between the initiating and receiving communication devices; and when both the initiating and receiving devices includes a list of enabled universal communication attributes of the first and second user; utilizing one or more of the enabled communication attributes of the first and second user to complete the communication connection between the initiating and receiving communication devices.

The system and method further include creating a user profile in which the user selects a desired communication attribute or multiple attributes which can be stored in the user's profile. The enabled attributes can be utilized by a network accessing the user's profile to complete the communication connection. This can be done, for example, by the user selecting one or more communication attributes from a list of universal communication attributes and passing the one or more attributes to a network, which stores the one or more attributes in the profile of the user.

The disclosed systems and methods utilize multiple components across several different types of networks. In an embodiment illustrated in FIG. 1, a system 1 has an initiating communication device 3 having a list of universal attributes and creates a connection 2 to a telecom 5 network in a cloud network 4. The telecom 5 network is composed of an Internet Protocol Multimedia Subsystem (IMS) 7 network. Within the IMS 7 network two primary systems are used, which are known as a Home Subscriber Server (HSS) 9 and a Call Session Control Function (CSCF) 11. The HSS 9 component checks the initiator's profile with a service database 6. The CSCF 11 functions primarily to determine the connection routing needed and can look up a unique identifier of the recipient from a North American Numbering Plan (NANP) database 18. A primary function of the NANP database 18 is to provide a list of different phone carriers routing paths to allow telecom 5 to make the connection to telecom 15. In addition, the CSCF 11 can route the call depending on selected attributes of the initiator to connect to an Assistive Communication Provider (ACP) 13. Selected attributes are passed from the initiating communication device 3 through the CSCF 11 to the ACP 13. The CSCF 11 can route the call through the recipient's telecom 15 network in the cloud network 4 through a connection 17 to a receiving communication device 19. When the initiating communication device 3 and the receiving communication device 19 belong to the same telecom network 5, the CSCF 11 can route the call directly to the recipient's receiving communication device 19 through connection 17.

Similarly, the recipient's telecom 15 network can contain an IMS, HSS, and CSCF, with access to ACP, service database and NANP database such as the components identified in telecom 5 network in the cloud network 4. The function of the telecom 15 may be the same as the telecom 5 since both components are based on current IMS standard implementation presently set by $3^{rd}$ Generation Partnership Project. Various changes and modifications to present standard implementations and future implementation standards of telecom networks are considered within the scope of the present methods and systems disclosed herein.

Figure 2:
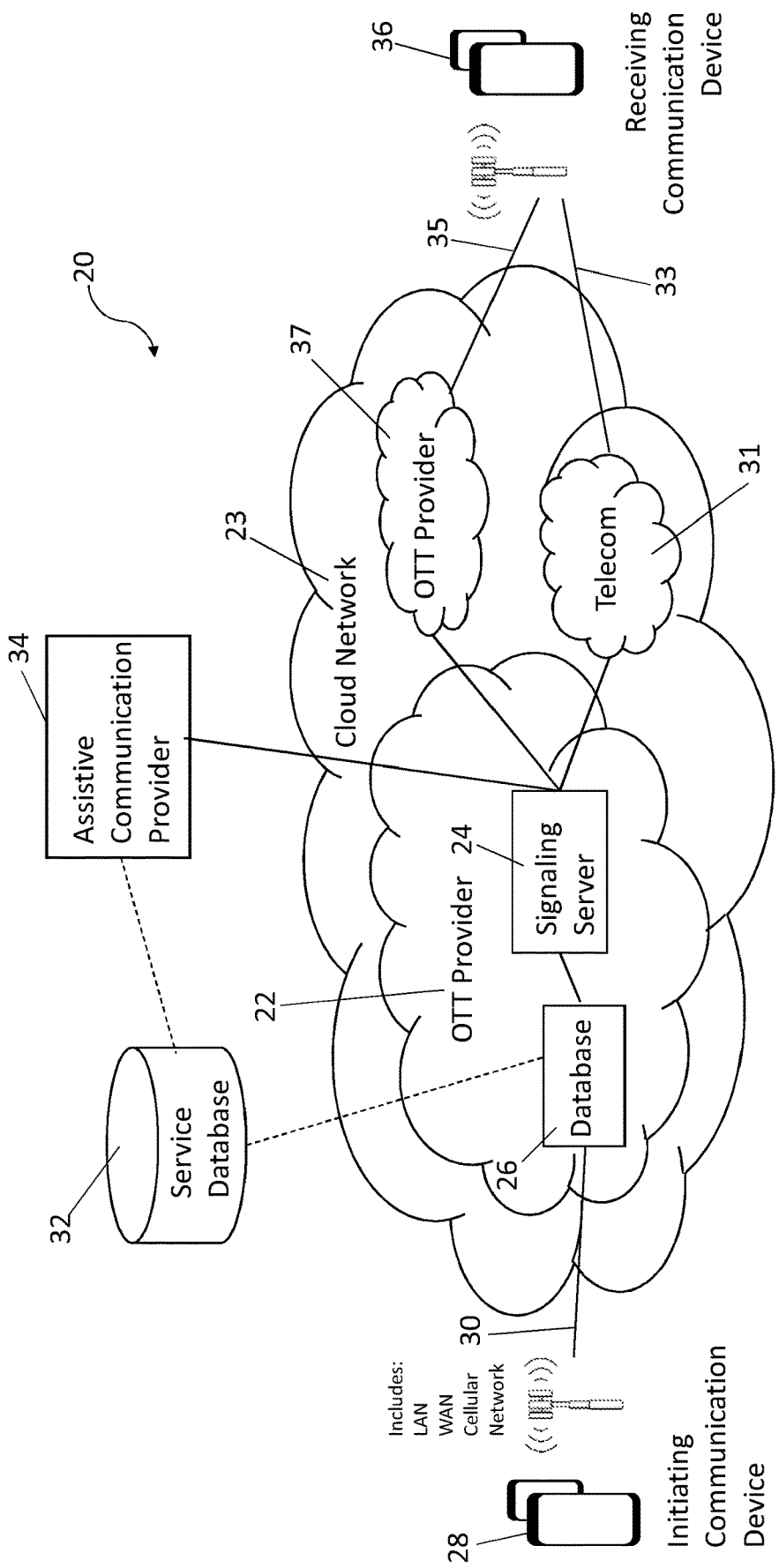
FIG. 2 illustrates an overview of a system with an over-the-top network in accordance with an embodiment of the present disclosure.

In an embodiment illustrated in FIG. 2, a system 20 of enhanced communication access uses a network of an Over-The-Top (OTT) provider 22 in a cloud network 23. An over-the-top network is typically a network composed of a signaling server 24 and a database 26 that makes a connection between two parties often using the same application. With the use of this type of network, an individual uses a communication device 28 to initiate a connection 30. The connection 30 is made to the database 26 which can look up the initiating individual's universal attributes that are selected on the device 28. The database 26 of the OTT provider 22 can verify eligibility with a service database 32 and communicate with the signaling server 24 to pass on the selected attributes to an assistive communication provider 34. After attributes are passed to the assistive communication provider 34, the call can be routed through the recipient's telecom 31 network or OTT provider 37 in the cloud network 23. A connection 35 is made to a receiving communication device 36 via the OTT provider 37 network or a connection 33 is made to the receiving communication device 36 via the telecom 31 network.

The components of the OTT provider 37 of the receiving party can be the same as and function the same as the components of the OTT provider 22 of the initiating party as shown in FIG. 2. Likewise, the components and function of the telecom 31 network of the receiving party can be the same as and function the same as the components of the telecom networks as shown in FIG. 1.

A suitable communication device used in this disclosure includes but is not limited to a mobile phone, smart home device, web browser, an over-the-top application running on a machine, or the like. Devices contain settings known as universal attributes that provide specific functions of data to be passed from one point to another. The device used to initiate a connection contains a list of enhanced universal attributes that assist with communication. Some examples of these universal attributes that assist with accessible communication contain Telecommunications Relay Services (TRS), Real-Time-Text (RTT), multi-language services, etc. Within these areas, attributes are added to allow new connections and possibilities for accessible communication for initiating and receiving parties. Attributes such as these can be compatible with Internet of Things (IoT) devices and provide options for individuals.

Figure 3:
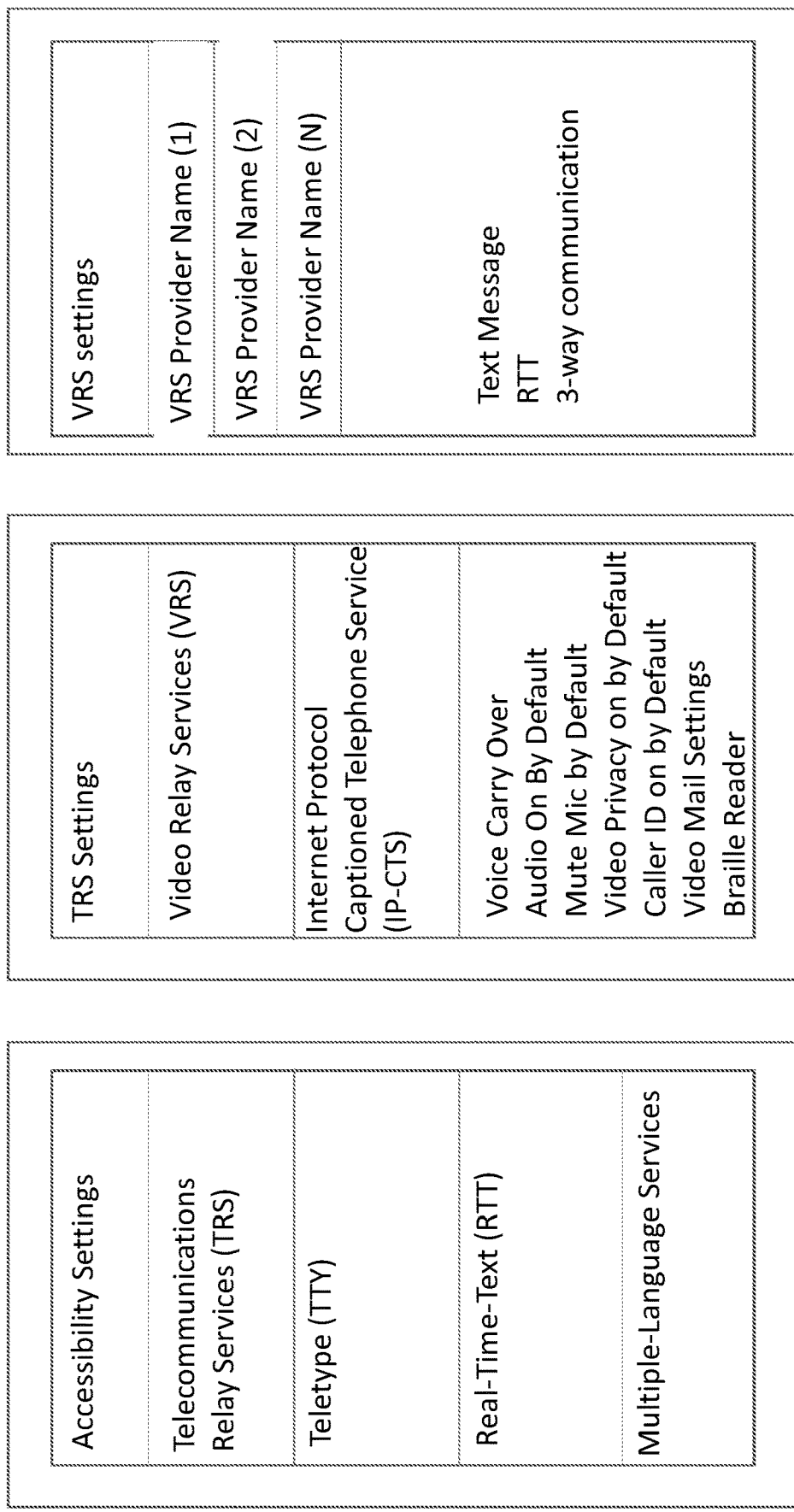
FIG. 3 shows an example listing of communication attributes.

Attributes available at a system level on a device allow for greater computability and enable emergency point to point calling. As shown in FIG. 3, these attributes include enabling Telecommunications Relay Services. One of these available services is Video Relay Service (VRS), which allows for sign-language interpreting services to be provided over video, audio and text connections. Another enabled service is Internet Protocol Captioned Telephone Service (IP-CTS) which allows for the use of a human or automated text transcription based on the audio feed during a connection. Deaf-blind users also have enhanced features with allowing combination of services with VRS, IP-CTS, the connection to RTT, Braille reader and screen readers. Other accessible services include foreign language services through automated translation services or human translation services. This is accomplished by developing a list of universal attributes on the communication device's settings menu. The user has the capability to choose one or more attributes specifically to be used for the connection. The attributes become enabled after being selected and passed through the network during a connection to another party.

Within Telecommunications Relay Services attributes, there contains options for VRS and IP-CTS. Along with those services, there is also general accessibility settings for these services that allow Voice-Carry-Over (VCO) which allows an individual to speak for themselves while they are accessing the service. This attribute helps the service providers understand what fits the individual's communication preferences while allowing enhanced audio because it splits the audio into two streams for the communication provider and the individual. Another option is to enable audio to be on by default, mute microphone by default, video privacy, caller identification (ID) to be passed on to the communication provider, and video mail settings.

Within the Video Relay Service attributes, there is an option to choose a provider licensed by the Federal Communications Commission. The available provider attributes are synchronized from a service database. Under each provider, for example Service Provider 1-Service Provider N, there is a unique identifier attribute. This is used to route connection (incoming and outgoing) to the selected service provider. Additional attributes mentioned above can be passed on to the service provider to assist with effective communication.

IP-CTS is an internet-based relay service system for people who communicate by speaking to hearing person and by reading the caption from hearing person through display on a telephone, a computer or other web-enabled device. Captioned telephone providers are licensed by the Federal Communications Commission listed from a database and are arranged with a unique identifier (Captioned Service Provider 1-Captioned Service Provider N). Within the captioned service provider, there is an attribute for automatic speech recognition captioning as well as human provided captioning services.

Deaf-Blind users can enable a combination of text and video services that integrate with a Braille keyboard or screen reader to use.

Foreign Language is another attribute listed to help with translation services from one language to another both by a human or by using automatic speech translation.

After attributes are selected on the communication device, the connection can be initiated through a network. The initiating individual uses the device with a specific identifier (such as but not limited to phone number, IP address, email address, personal identifier information, or the like) to start the connection. The connection can be made over an IMS network or an OTT network.

Long Term Evolution (LTE) is industry standard for wireless broadband. IMS is the current LTE standard including next generation network (5G) and provides telephony-based services over Internet Protocol, such as voice, text, and Video over LTE (VOLTE/Vo5G). Enhancing the IMS to support accessibility functions will be used by all major carriers, manufacturers, and operating systems. Lower power consumption on mobile due to dedicated circuitry supporting IMS. Enhanced IMS is integrated into Dialer and native operating system framework making it more reliable and more secure than an application solution.

Adding to Home Subscriber Server (HSS) the user's accessibility profile from the user's equipment to seamlessly access a variety of telecommunications relay services and multiple language allows for enhancements of under-developed HSS settings on a network to be inclusive of accessibility settings.

Currently the Telecommunications Relay Service contains a database of all eligible users of this service. This database, the iTRS Database, will be synced with phone carriers to enable communication of data between iTRS and HSS to enhance the efficiency of call routing queries and to allow connections/call flow with TRS provided equipment. The HSS component of the IMS will incorporate a connection to the iTRS database to continue to support current accessible telephony devices.

Session Description Protocol (SDP) modifications and enhancements include adding an accessibility value such as accommodation preferences (including but not limited to deaf, blind, deaf-blind), phone number for the service provider to call, language preferences such as foreign language (e.g., Spanish) or Voice-Carry-Over, and multiple party conference calls. The User Equipment or IMS Server will add/modify a value for the person who wants to place or receive a call (with his/her accessibility settings enabled). It can also be used to determine that the call is an accessibility call for call centers that have specialized agents such as an American Sign Language (ASL) customer service representative.

FIG. 4 illustrates an example of a hierarchy structure of communication attributes showing a list of different settings and parameters of different types of assistive communication services.

Figure 5:
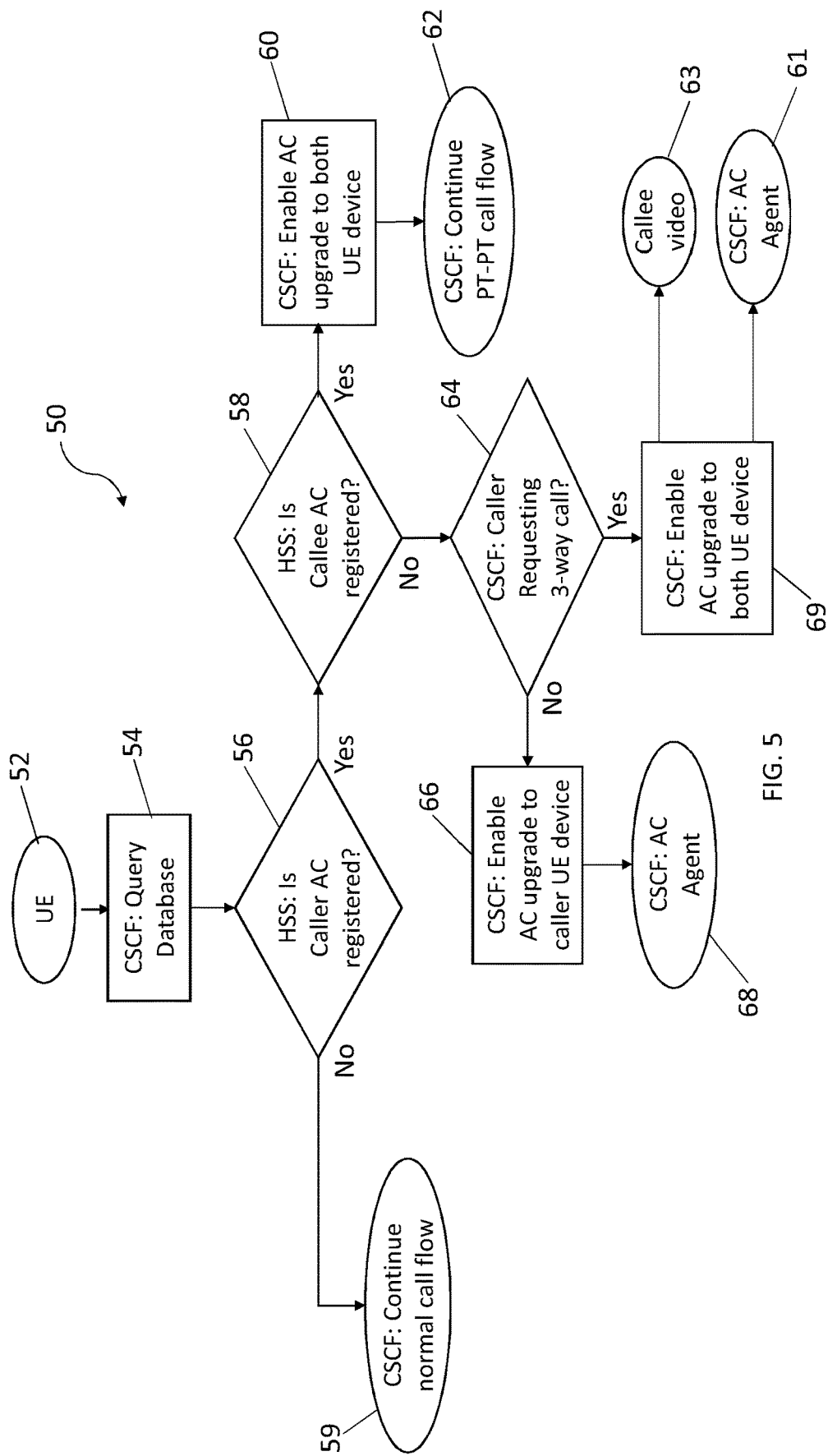
FIG. 5 is a flow chart showing an example of an IMS CSCF decision block.

FIG. 5 illustrates an example of a CSCF Decision Block 50 wherein the User Equipment (UE) 52 attributes are passed to the CSCF Query database 54. The user equipment 52 verifies eligibility to operate on that network. When the individual attempts to make a connection, the CSCF will query the database in HSS 56. Then it will check the universal attributes pertaining to Assistive Communication (AC) on the network HSS. If the caller is not an assistive communication user, the call will continue through the normal CSCF call flow 59. If the caller is an assistive communication user, the network HSS will check if the receiving party is an assistive communication user 58. If the receiving party is an eligible assistive communication user 60, then the connection will be passed through as a direct, point-to-point call 62. If the receiving party is not an assistive communication user, then the CSCF will check the attributes on the caller's device and see if the caller is requesting a three-way video call 64. If the initiating caller is not requesting a three-way video call, then the CSCF will enable 66 the assistive communication to upgrade the connection to a video call for an assistive communication agent for the initiating caller 68. If the initiating caller is requesting a three-way call with an assistive communication agent and the receiving party, then the connection will be upgraded 69 on both communication devices while connecting with the assistive communication agent 61 and the receiving party 63.

Figure 6:
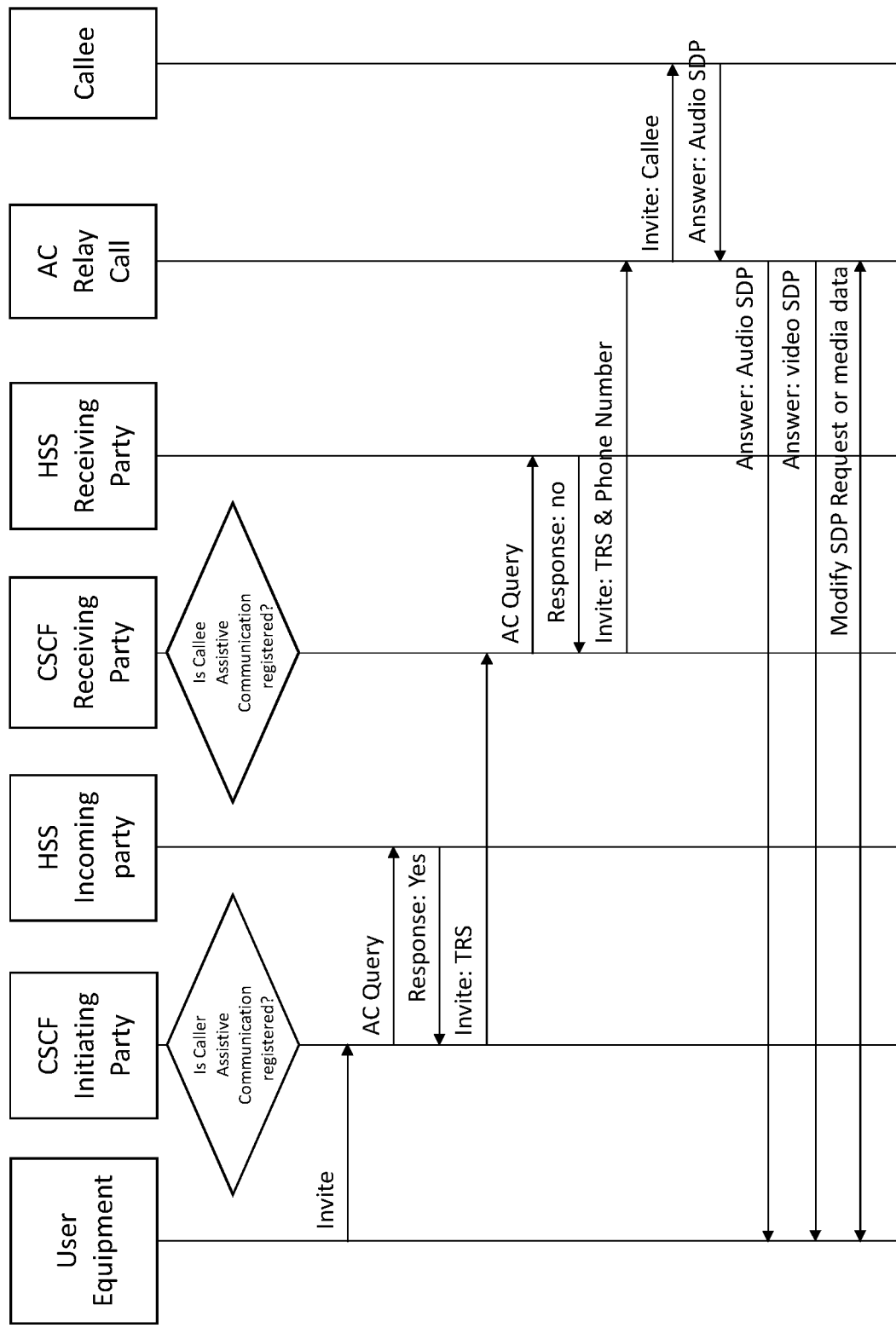
FIG. 6 is a flow chart showing an example of an IMS Video Relay protocol.
Figure 7:
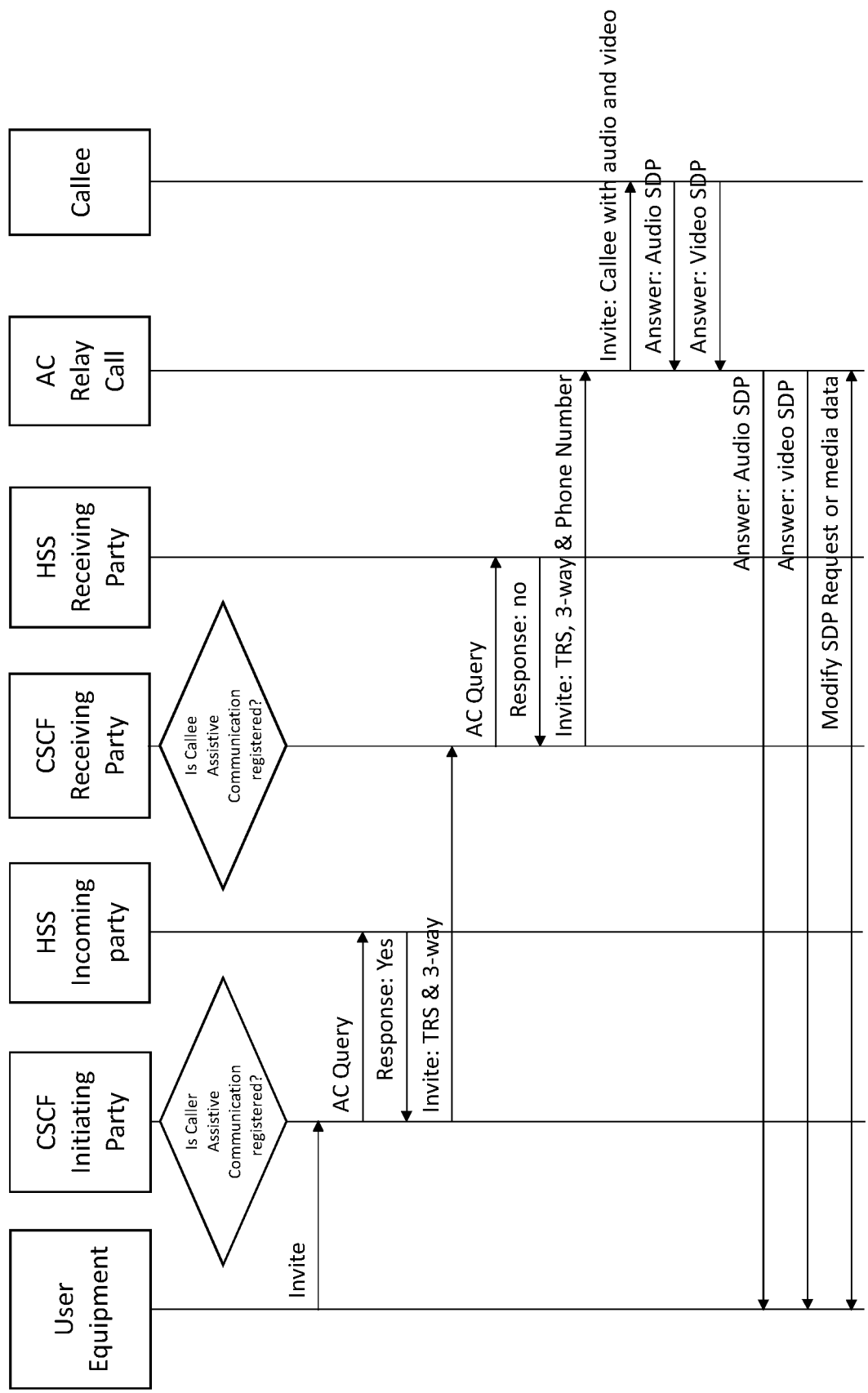
FIG. 7 is a flow chart showing an example of an IMS Video Relay 3-way protocol.

FIG. 6 illustrates an example of an IMS Relay. The initiating party device will check if there are any assistive communication attributes that are selected. The CSCF of the initiating party will check if the caller is a registered assistive communication user. If the initiating caller is registered, then the CSCF will check the HSS settings of the initiating party and add an invite to telecommunications relay services. The connection is routed to the receiving party's CSCF and checks the receiving party's HSS settings. If the receiving party is not a registered assistive communications user, then the initiating party's CSCF will route the connection to an assistive communications service. That assistive communication service will receive the audio and/or video along with the unique attributes of voice-carry-over, FIG. 7 illustrates an example of an IMS 3-way process. The initiating device will check if there are any communication attributes that are selected. The CSCF of the initiating party will check if the caller is a registered accessible communication user. If the initiating caller is registered, then the CSCF will check the HSS of the initiating party and add an invite to telecommunications relay services and add an attribute for 3-way video calling. If the receiving party responds by accepting the invitation for 3-way video calling, then the connection will be upgraded to allow the initiating party, service provider, and receiving party to share a video connection.

Figure 8:
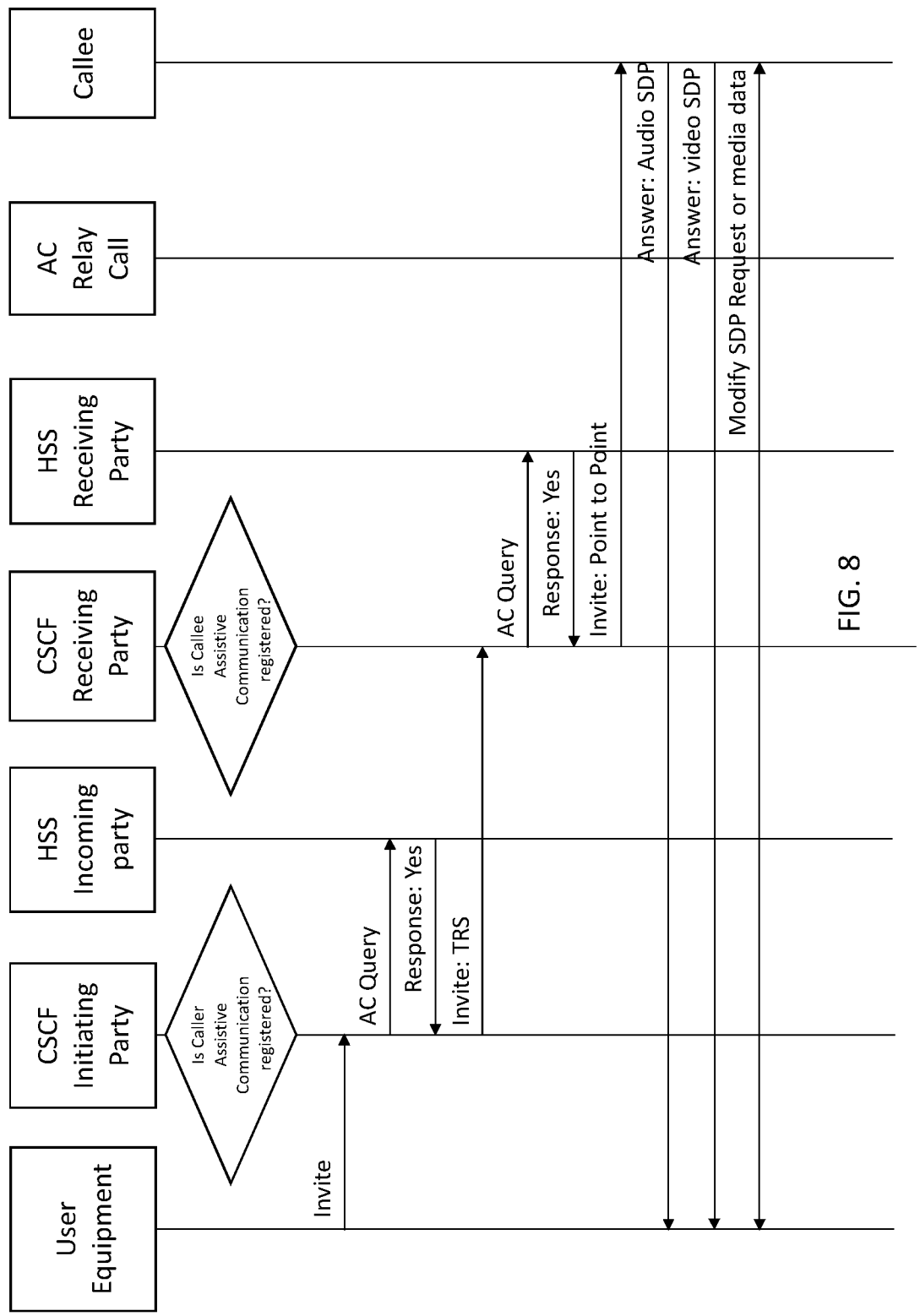
FIG. 8 is a flow chart showing an example of an IMS Video Point to Point protocol.

FIG. 8 illustrates an example of an IMS Point to Point. The initiating device will check if there are any communication attributes that are selected. The CSCF of the initiating party will check if the caller is a registered assistive communication user. If the initiating caller is registered, the CSCF will check the HSS of the initiating party and TRS services are activated. If the receiving party has the same assistive communication attribute (specifically for Video Relay Services) then the call will be upgraded to a point-to-point call so that both parties can communicate by video without the use of an assistive communication provider. In the same way, captioning services will be used by each selected party.

Figure 9:
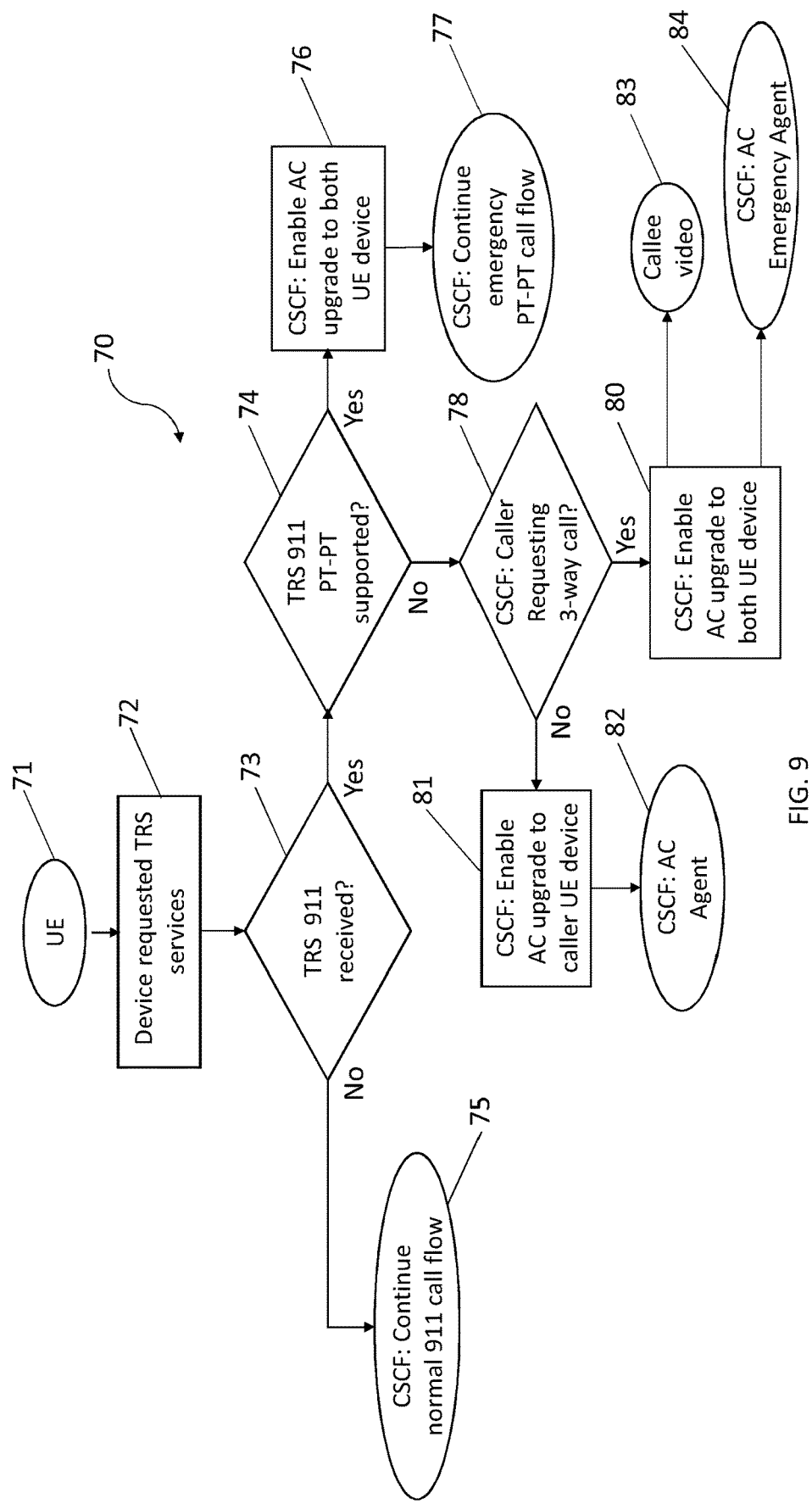
FIG. 9 is a flow chart showing an example of an IMS Emergency decision block.

FIG. 9 illustrates an example of an Emergency Decision Block 70 and IMS Point to Point (PT-PT) Emergency Scenario, IMS Relay Emergency. For an emergency call, the initiating party uses the device to place a connection to emergency services 72. The device request is a priority to search 73 for enabled TRS attributes on the user equipment 71. If there is no assistive communication requested through the universal attributes or the network HSS, the call logic directs the call to a Public-Safety Answering Point (PSAP) operator following the standard call flow 75. If the initiating caller has requested TRS settings through the universal attributes or through network HSS, the call logic checks the PSAP to see if that center will accept a point-to-point call 74. If yes, it will enable the connection on both the user equipment and with the PSAP operator 76 to continue with a direct emergency call 77. If the PSAP center does not have point-to-point capabilities, then the CSCF will upgrade the connection 76 to support including an accessible communication operator and the PSAP operator 77. The connection can also be upgraded to support three-way calling 78 of the assistive communication provider and the PSAP operator. If the receiving party is not an assistive communication user, then the CSCF will check the attributes on the caller's device and see if the caller is requesting a three-way video call 78. If the initiating caller is not requesting a three-way video call, then the CSCF will enable 81 the assistive communication to upgrade the connection to a video call for an assistive communication agent 82 for the initiating caller. If the initiating caller is requesting a three-way call with an assistive communication agent and the receiving party, then the connection will be upgraded 80 on both communication devices while connecting with the assistive communication emergency agent 84 and video 83 of the receiving party.

Figure 10:
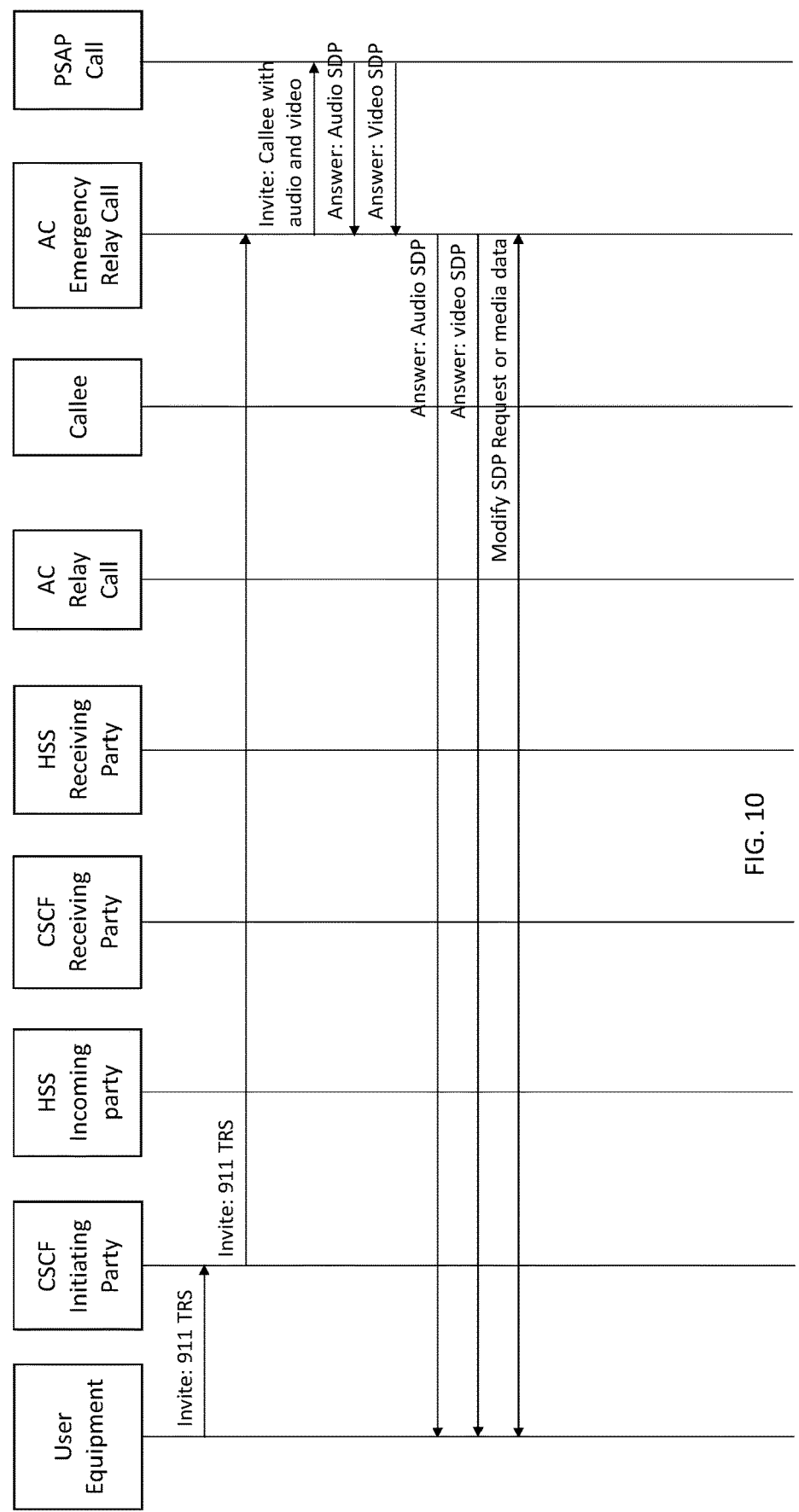
FIG. 10 is a flow chart showing an example of an IMS Relay Video Emergency protocol.

FIG. 10 illustrates an example of an Emergency IMS VRS. The initiating device will check if there are any communication attributes that are selected. If the initiating caller is registered, emergency TRS services are activated. The CSCF initiating party will connect directly to assistive communication emergency relay call center with communication attributes. The assistive communication makes the connection to local emergency PSAP. The call will continue with video, audio and text.

Figure 11:
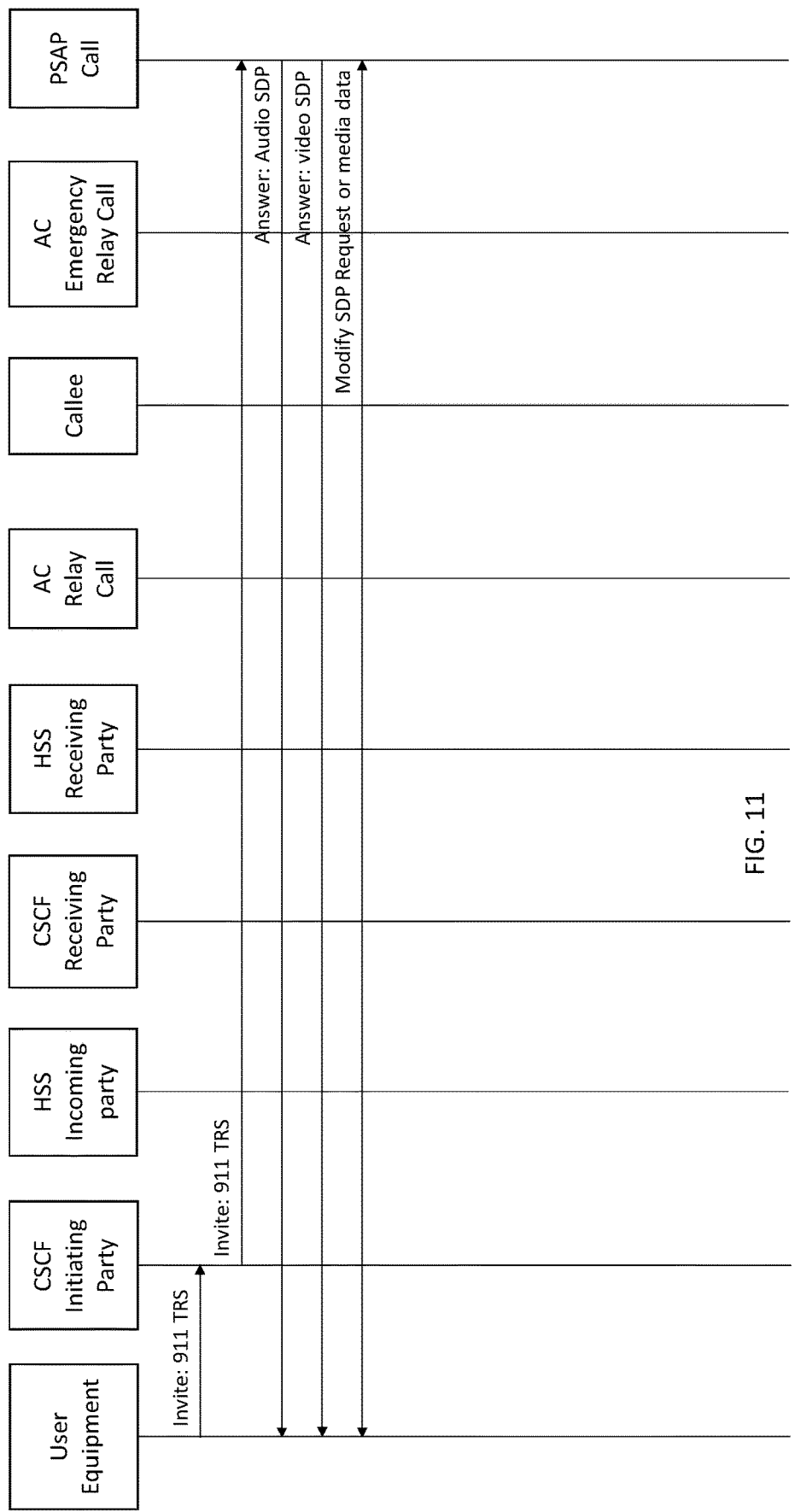
FIG. 11 is a flow chart showing an example of an IMS Video Point to Point Emergency protocol.

FIG. 11 illustrates an example of an Emergency IMS Point to Point. The initiating device will check if there are any communication attributes that are selected. If the initiating caller is registered and the PSAP has the ability to handle a direct TRS call, the point-to-point emergency TRS services are activated. The CSCF initiating party will connect directly to local emergency TRS-supported PSAP. The call will continue with video, audio and text.

Emergency Accessibility Settings-being able to make emergency calls from any mobile device with any accommodation. Geolocation services supported through Accessibility TRS calls including e911.

Emergency Accessibility features for 911 calls by allowing improved dialing options built into the native operating system. When a user accesses a locked communication device, typically the only option is to place an emergency call. With these enhanced features, the device now allows placing an emergency call with additional accessibility options. If the user requires additional services, the connection will be directed to a PSAP operator and link the communication service provider into the connection.

Unlimited access for someone needing phone accommodations to be able to call emergency services through an accessibility service of their choice. Currently, for a person with disabilities to access emergency services, they must be using their own mobile device, with the appropriate software/application, and be able to access that in time of an emergency. With these new enhancements, any individual can choose any mobile device available to them, and access emergency services through a support of their choice.

Session Initiation Protocol (SIP) Invite and SDP Modifications allow for more creativity in call routing to allow people with disabilities to be directly serviced by government agencies and private companies.

The enhanced accessible communication attributes can be passed over another type of network. This OTT network provides similar connections to accessible communication services but using different paths. An OTT solution can work on an OTT network or telecom network.

Figure 12:
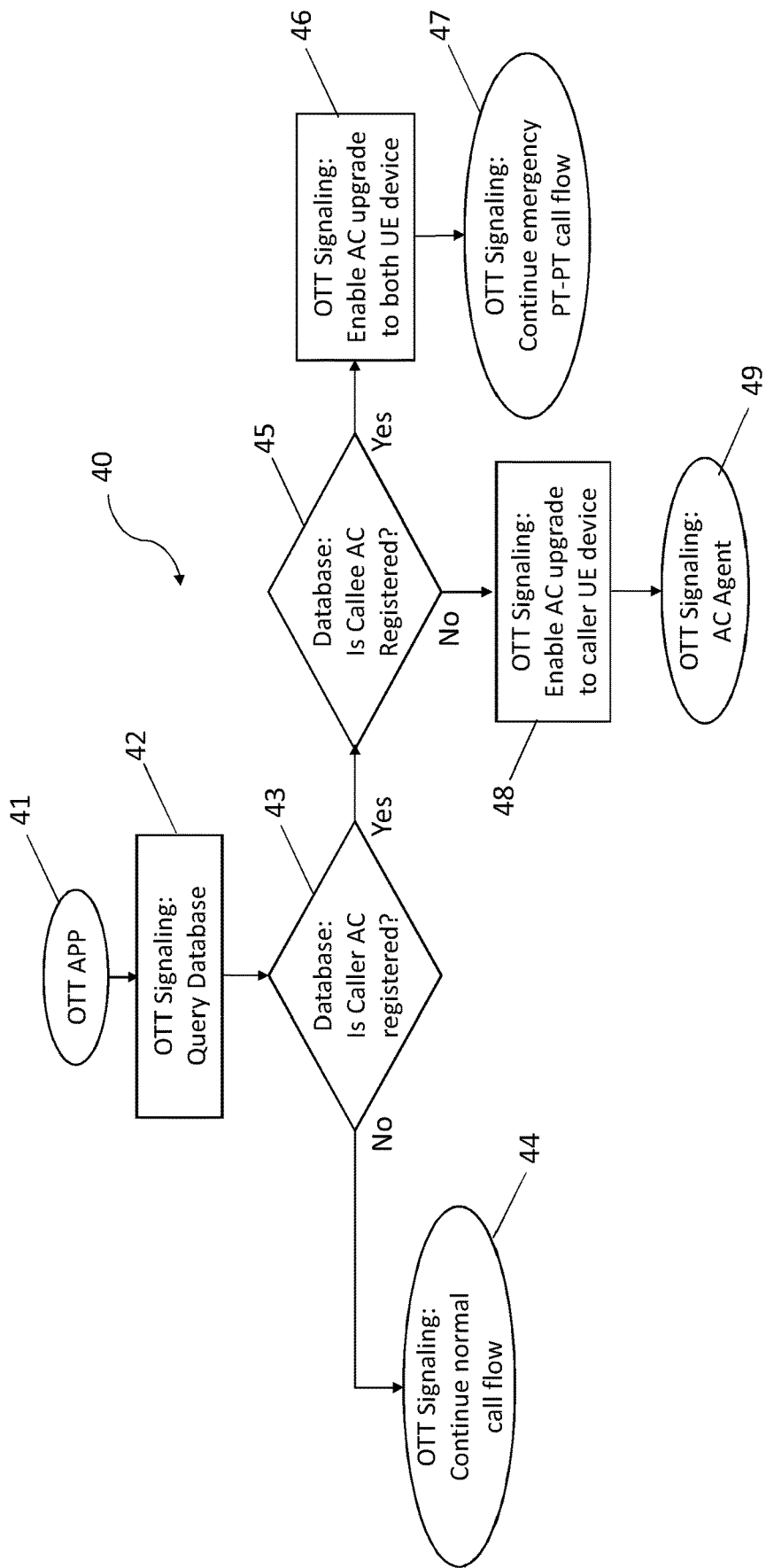
FIG. 12 is a flow chart showing an example of an OTT Signaling decision block.

FIG. 12 illustrates an example of an OTT Signaling Block 40. When the initiating party is using an over-the-top application 41 the network connection follows accordingly. If the universal attribute for assistive communication (AC) is enabled the application will send that data to the OTT signaling query database 42. The database 42 will check if that initiating caller is a registered Assistive Communication (AC) user 43. If the caller is not, the OTT signaler continues the connection with its intended call path 44. If the user is a registered accessible communication user, the connection will first check if the receiving party is also a registered accessible communication user 45. If both parties are registered accessible communication users 46, then the connection will be upgraded to accept a point-to-point call 47. If the receiving party is not a registered accessible communication user, then the connection will be upgraded 48, and the OTT signaler will connect to an accessible communication agent 49.

Figure 13:
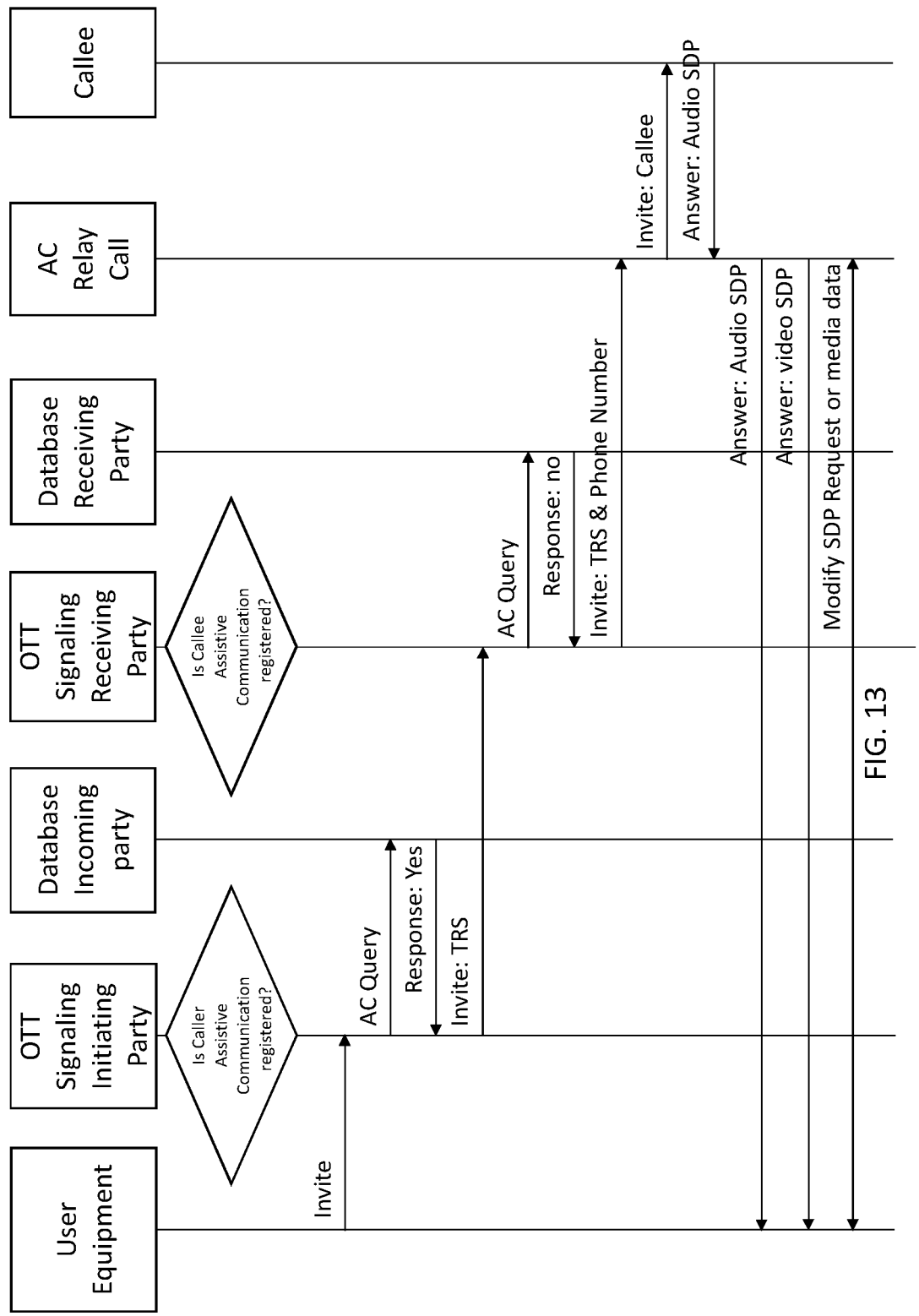
FIG. 13 is a flow chart showing an example of an OTT Video Relay protocol.
Figure 14:
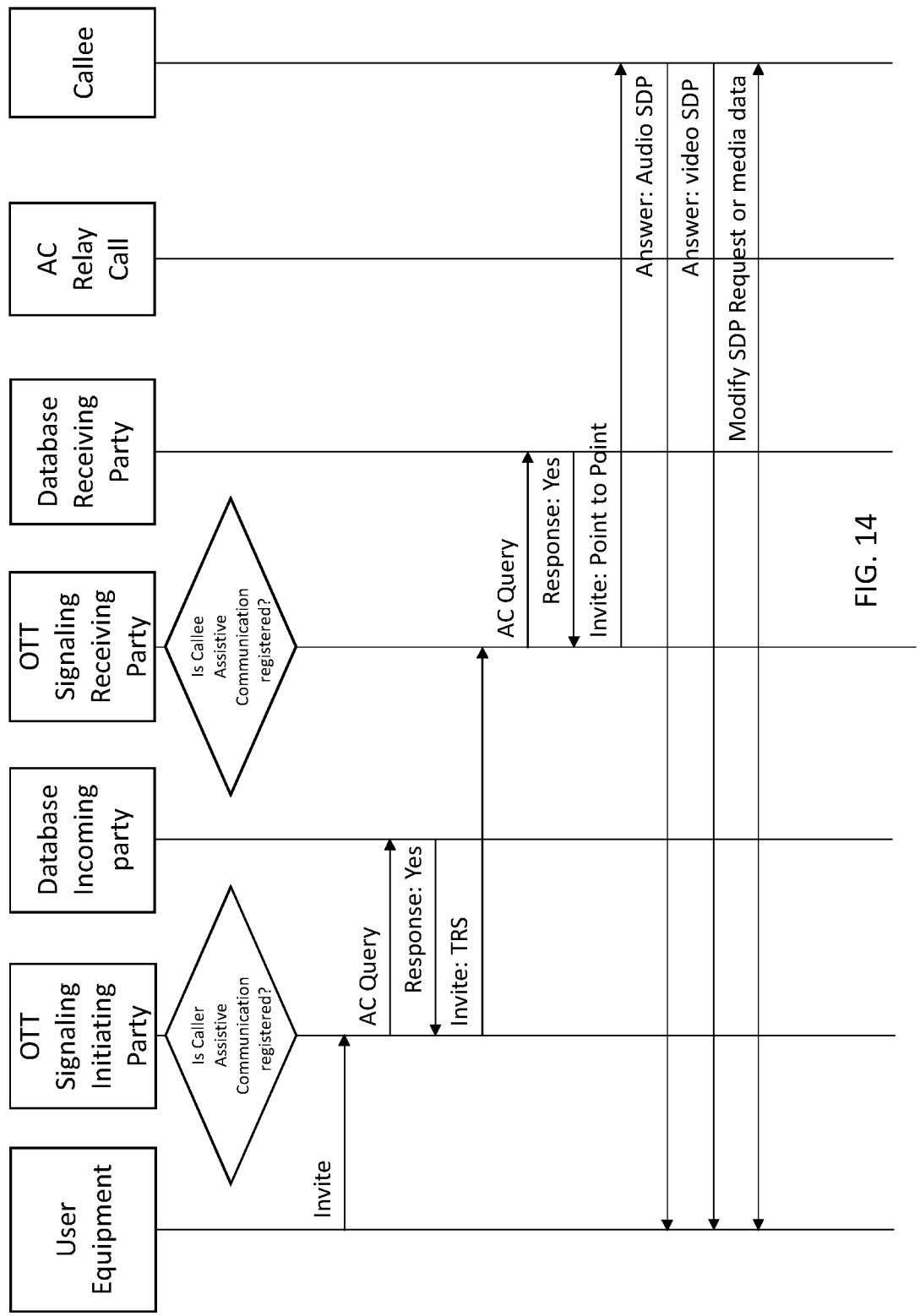
FIG. 14 is a flow chart showing an example of an OTT Video Point to Point protocol.

FIG. 13 illustrates an example of an OTT Relay Scenario wherein an OTT connection with communication attributes looks as follows. The initiating device has selected universal attributes that involve accessible communication service providers. The OTT signaling server checks the universal attributes and checks a database to verify that the caller is registered. That response from the database provides a query to check the receiving party and if they are first registered onto the network. The next step involves checking if the receiving party is also a registered accessible communication user. If the receiving party has the same accessible communication preference with VRS and is a sign-language user, the connection is passed through as a point-to-point call, as shown in FIG. 14. If the receiving party is not an assistive communication user or is registered on the network, then the connection is routed to an assistive communication provider and unique identifier and other attributes are passed on to make the connection to the receiving party.

Figure 15:
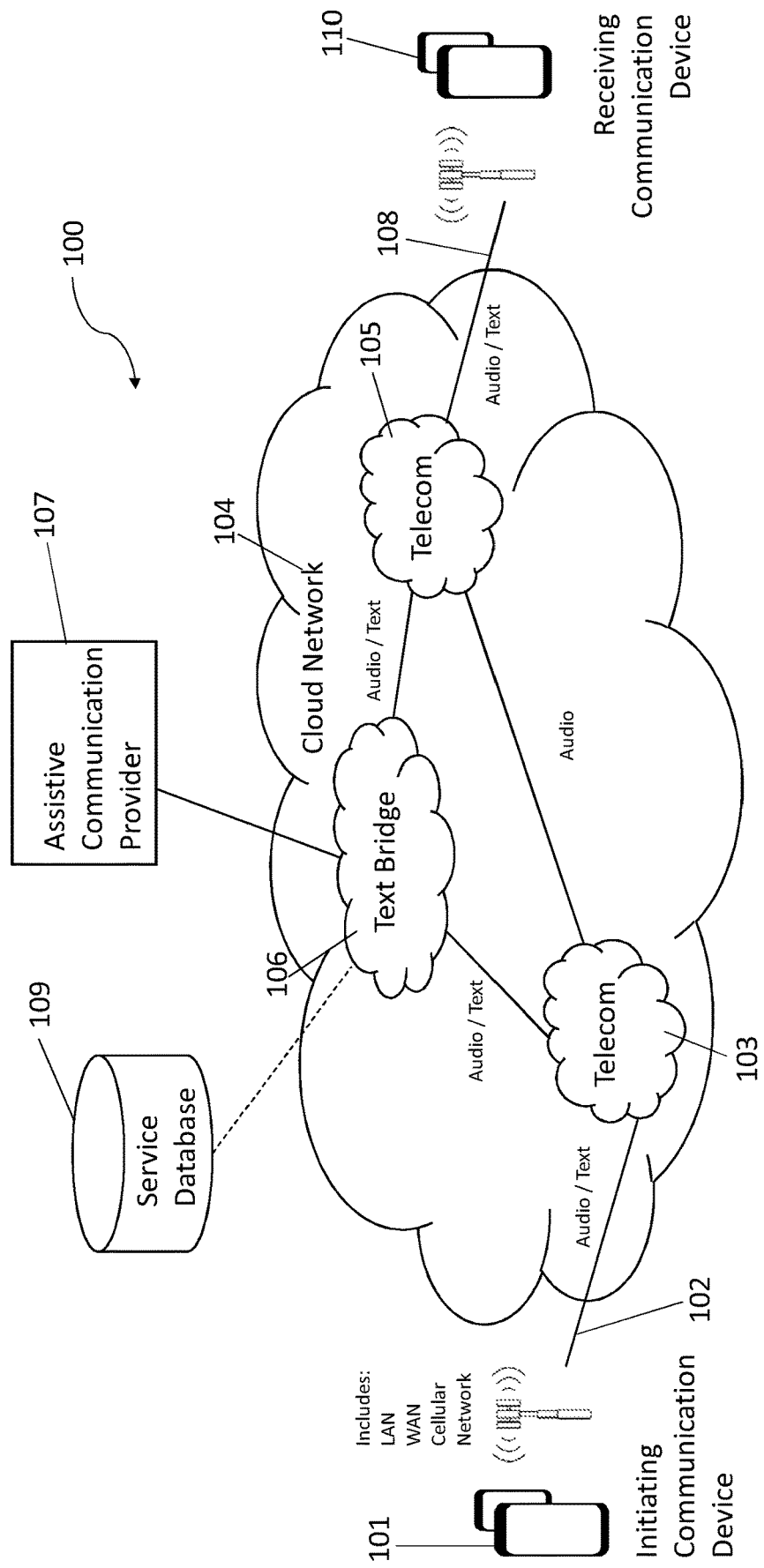
FIG. 15 illustrates an overview of a system with Captioning Services in accordance with an embodiment of the present disclosure.

An embodiment illustrated in FIG. 15, shows an example of a system 100 of enhanced communication when the initiating party or receiving party has the unique attribute of captioning services enabled. An initiating communication device 101 makes a connection stream 102 to a telecom network 103 in a cloud network 104 which will check if there is captioning services attributes selected. A text bridge 106 of the initiating party will check a service database 109 to see if the caller is a registered assistive communication user. The handshake is initialized through the stream connection 102, telecom 103, telecom 105, stream connection 108 and reaches a receiving communication device 110. The receiving communication device 110 sends audio data through the data stream connection 108, telecom 105, telecom 103, data stream connection 102 and reaches initiating communication device 101. An audio stream is split in the device 101 and the first audio stream passes through data stream connection 102, telecom 103 and to the text bridge 106. The text bridge 106 sends an audio stream to the assistive communication provider 107. The assistive communication provider 107 returns text transcription of that audio stream in real-time. The text from the ACP 107 passes through the text bridge 106, telecom 103, connection 102 to the device 101. Meanwhile, a second audio stream goes through a speaker in the device 101 for the initiating party to hear.

The telecom networks 103 and 105 may contain access to an IMS, HSS, and CSCF with links to an ACP, service database and NANP database as illustrated by the network components shown in FIG. 1. When the initiating communication device 101 and the receiving communication device 110 belong to the same telecom network, the text bridge 106 can route the call directly to the receiving communication device 110 through connection 108 and to the initiating communication device 101 through connection 102.

Figure 16:
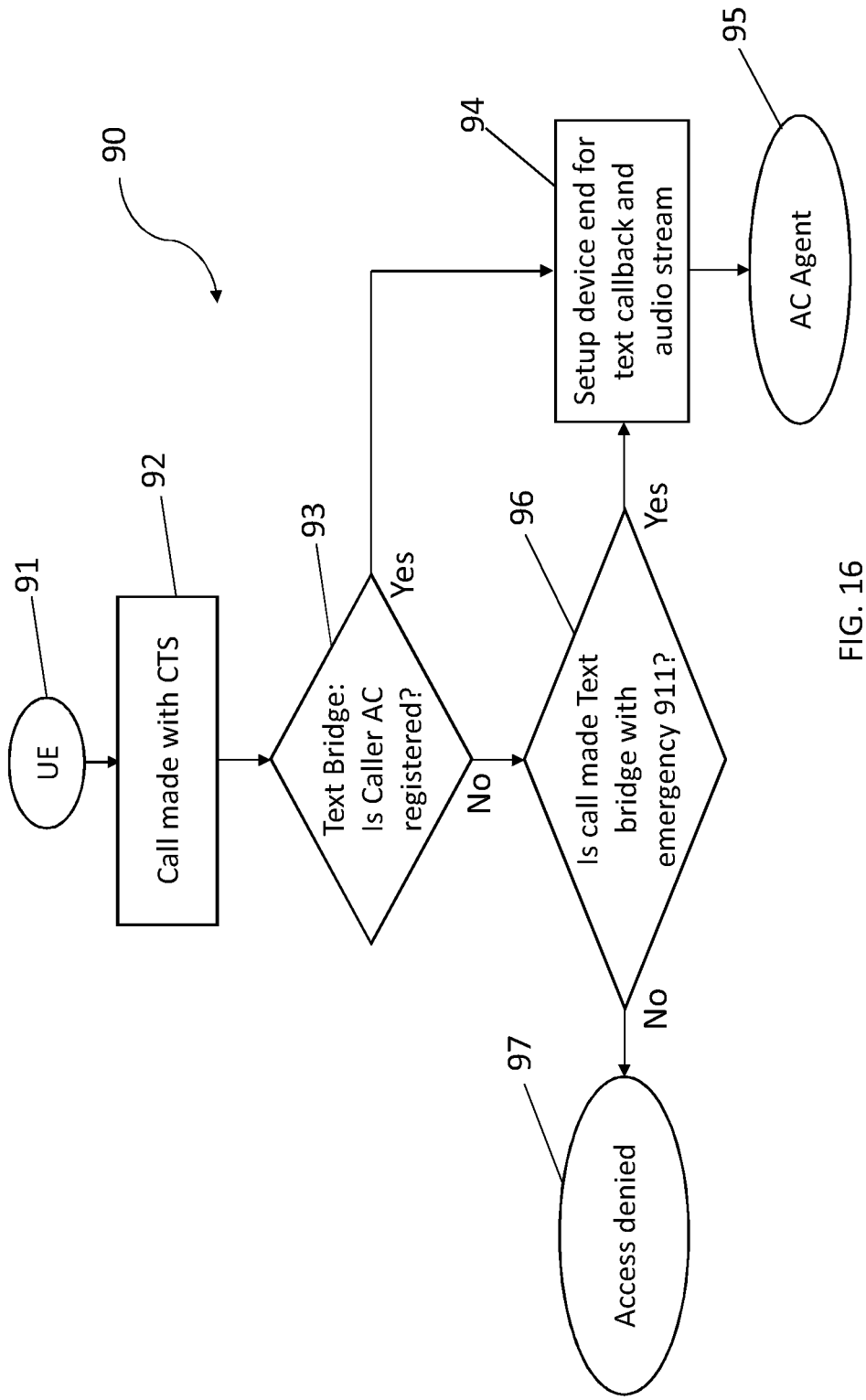
FIG. 16 is a flow chart showing an example of a text bridge decision block.
Figure 17:
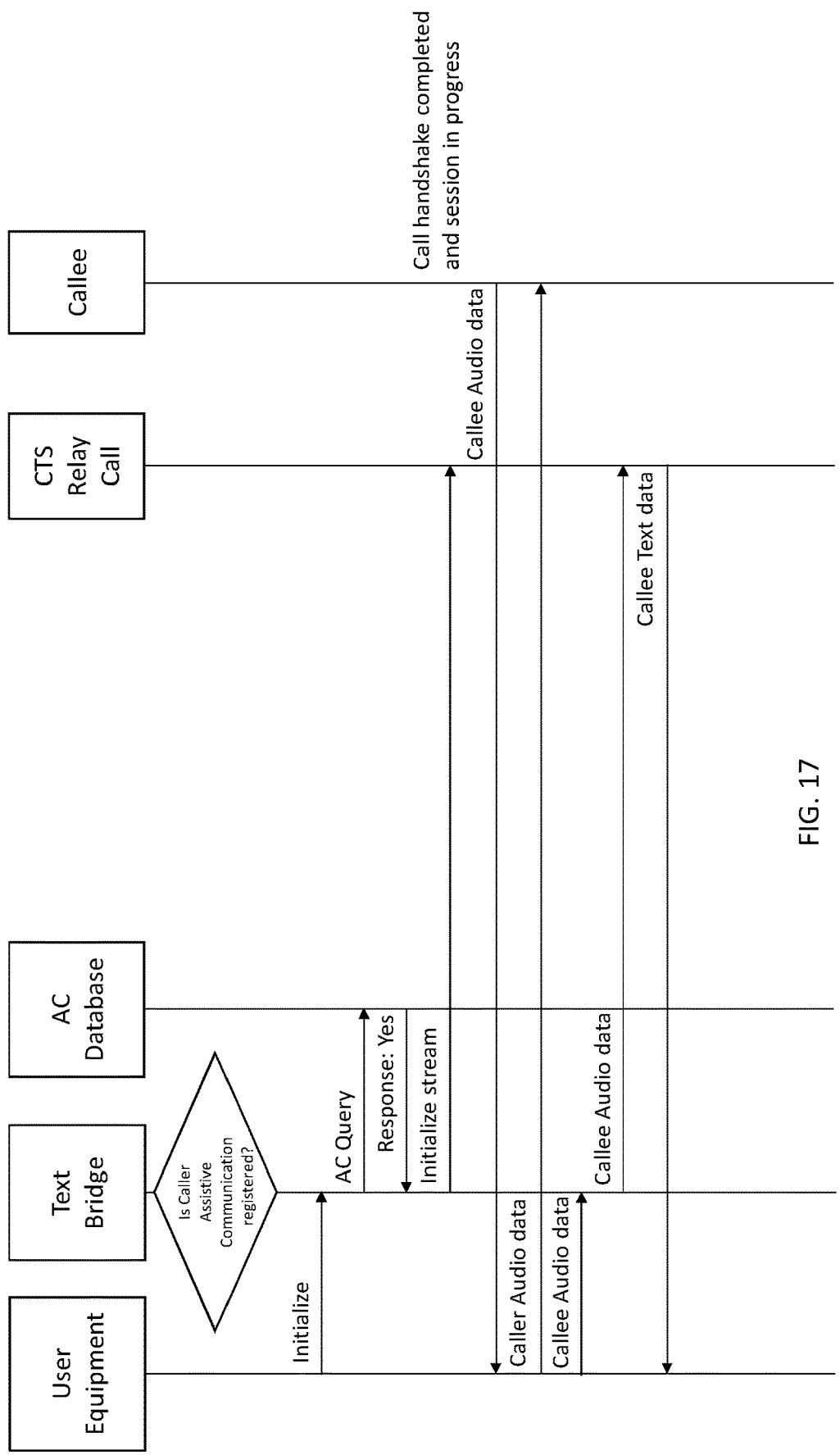
FIG. 17 is a flow chart showing an example of a CTS Relay protocol.
Figure 18:
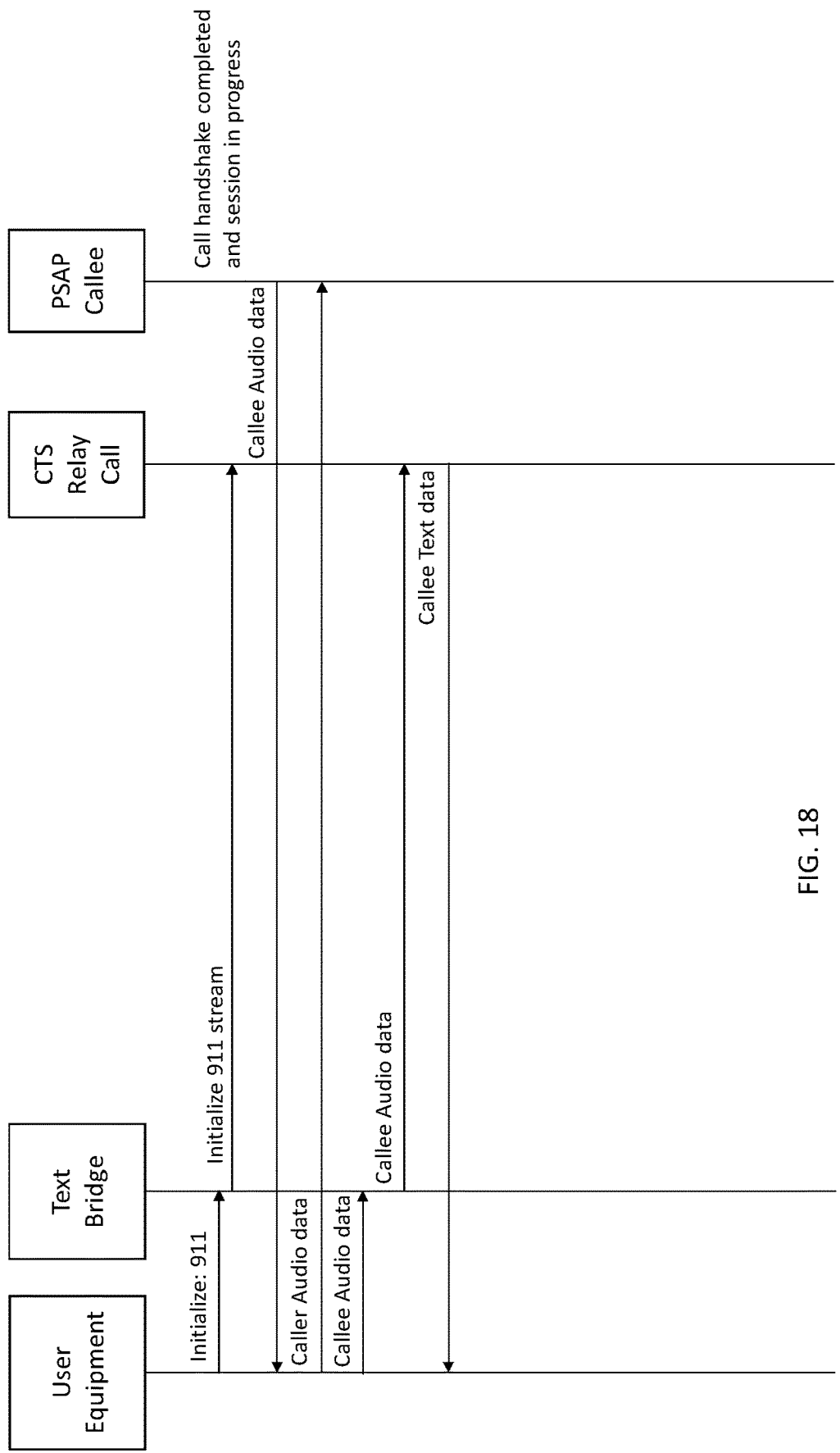
FIG. 18 is a flow chart showing an example of a CTS Relay Emergency protocol.

FIG. 16 illustrates an example of a Captioning Text Bridge Signaling Block 90. In FIG. 16, the initiating communication device 91 contains captioning as one of the universal attributes. When the initiating party enables captioning as one of the universal attributes 92, the device sends captioning attributes to the call. The text bridge database checks to see if the initiating party is an accessible communication user 93, as shown in FIG. 17. If the individual is an eligible user, the connection will trigger the device to set up the request to receive text input and send the audio stream to the selected service provider 94. The connection will be made with the accessible communication agent 95. If the caller is not registered as an eligible captioning user, the text bridge will check if the connection needs to be placed to an emergency PSAP operator 96. If it is not an emergency call, the access to the accessible communication will not be initiated because the user's eligibility has not been verified 97. As shown in FIG. 18, if the call is needing to be placed with an emergency 911 operator, the eligibility and registration can be overridden and the individual can connect to both the 911 PSAP operator and the accessible communication service 96.

Figure 19:
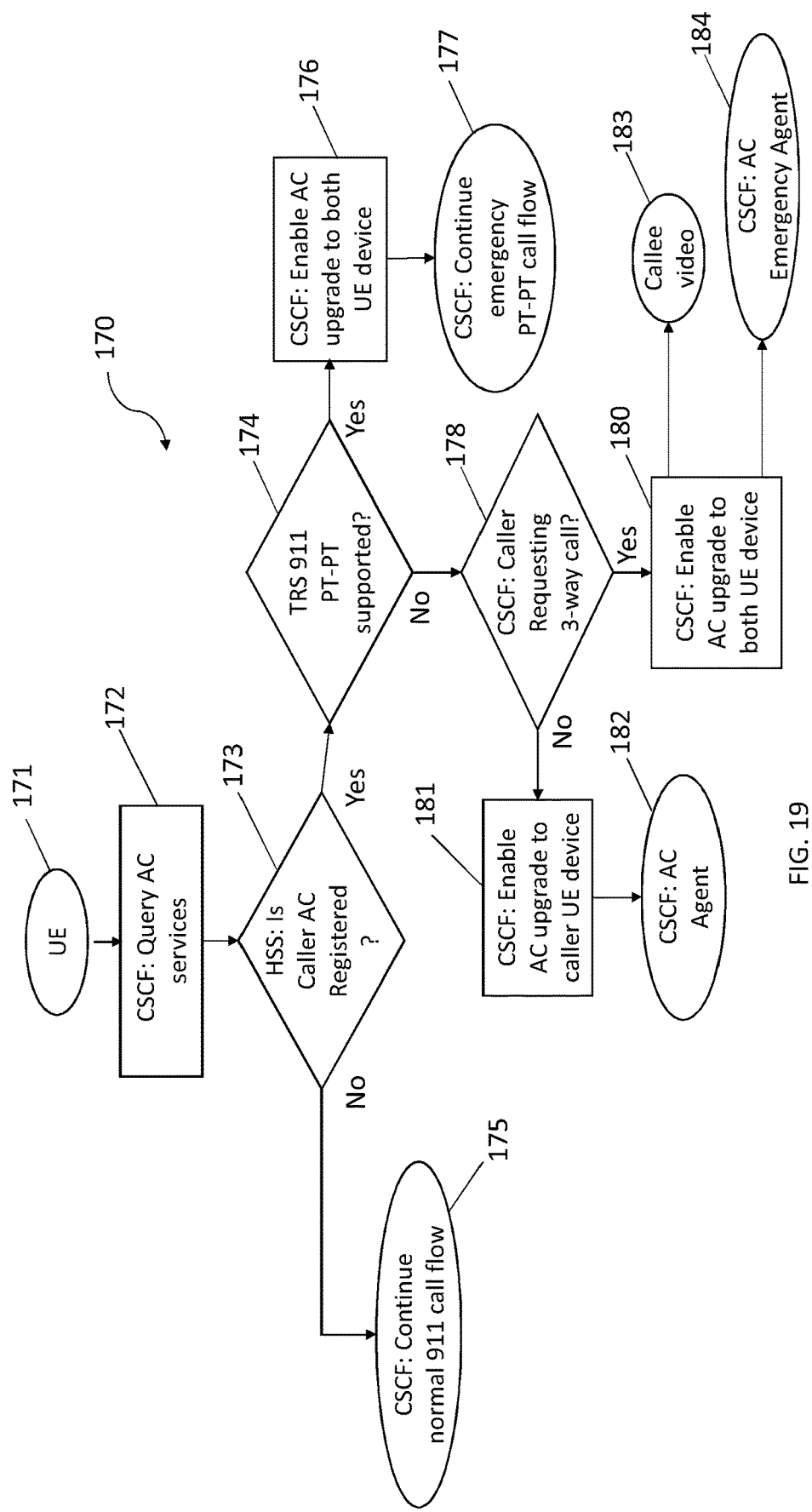
FIG. 19 is a flow chart showing an example of an IMS CSCF Emergency Decision block.

FIG. 19 illustrates an example of an Emergency Decision Block 170 and IMS Point to Point Emergency Scenario, IMS Relay Emergency. The initiating party uses the device 171 to place a connection to emergency services through CSCF query database 172. If there is no universal attribute selected, then the CSCF will search the HSS database 173 to see if the caller AC is registered. If yes, the request goes to TRS 911 Point-to-Point supported 174. If there is no accessible communication requested through the universal attributes or the network HSS, the call logic directs the call to a Public-Safety Answering Point (PSAP) operator following the standard call flow 175. If the initiating caller has requested TRS settings through the universal attributes or through network HSS, the call logic checks the PSAP to see if that center will accept a point-to-point call 174. If yes, it will enable the connection on both the user equipment and with the PSAP operator 176 to continue with a direct emergency call 177. If the PSAP center does not have point-to-point capabilities, then the CSCF will upgrade the connection 176 to support including an accessible communication operator and the PSAP operator 177. The connection can also be upgraded to support three-way calling 178 of the accessible communication provider and the PSAP operator. If the receiving party is not an assistive communication user, then the CSCF will check the attributes on the caller's device and see if the caller is requesting a three-way video call 178. If the initiating caller is not requesting a three-way video call, then the CSCF will enable 181 the assistive communication to upgrade the connection to a video call for an assistive communication agent 182 for the initiating caller. If the initiating caller is requesting a three-way call with an assistive communication agent and the receiving party, then the connection will be upgraded 180 on both communication devices while connecting with the assistive communication emergency agent 184 and video 183 of the receiving party.

Figure 20:
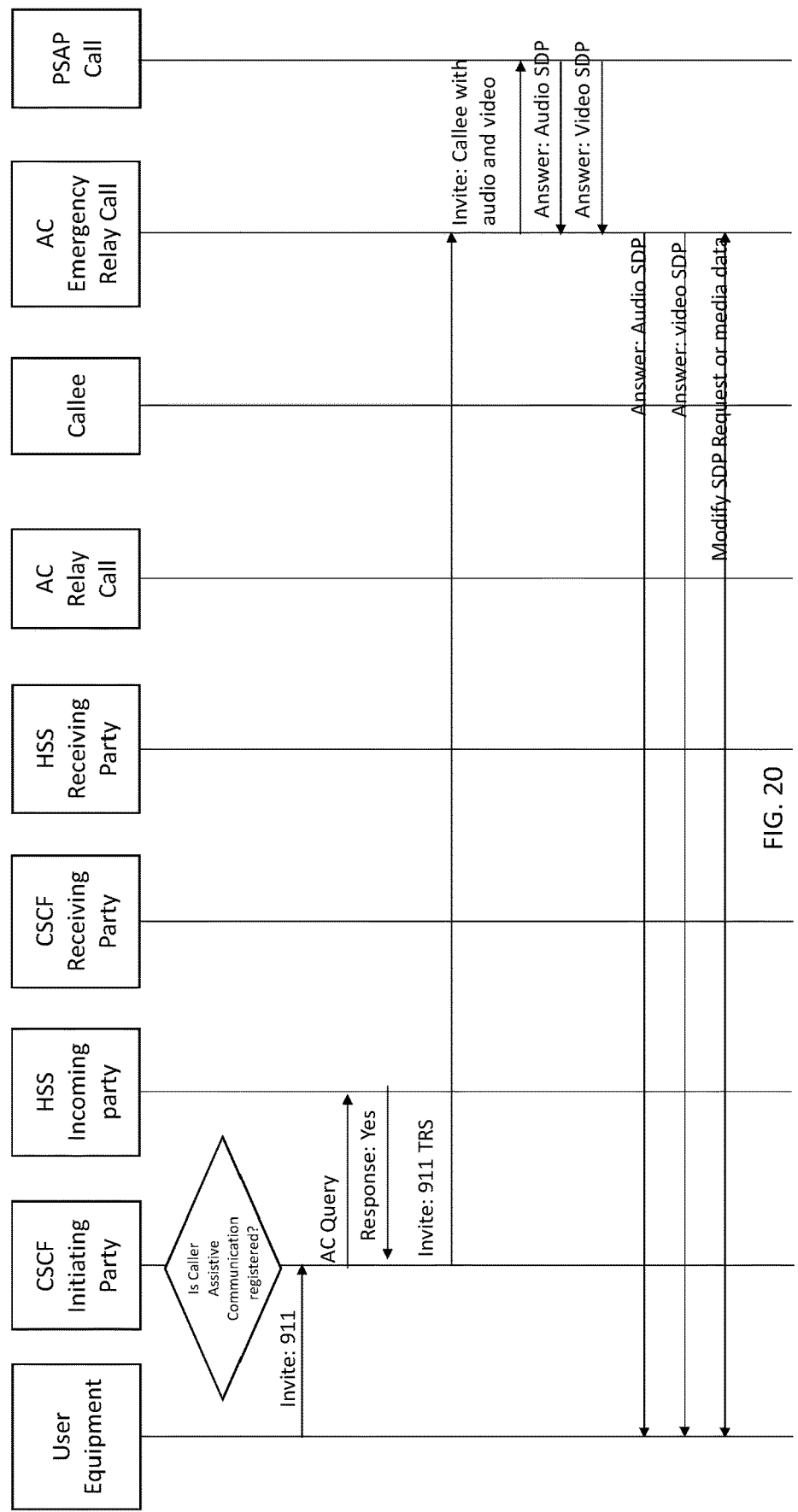
FIG. 20 is a flow chart showing an example of an IMS CSCF Relay Emergency protocol.

FIG. 20 illustrates an example of an IMS CSCF Relay Emergency. The initiating device will check if there are any communication attributes that are selected. The CSCF of the initiating party will check if the caller is a registered assistive communication user. If the initiating caller is registered, emergency TRS services are activated. The CSCF initiating party will connect directly to assistive communication emergency relay call center with communication attributes. The assistive communication makes the connection to local emergency PSAP. The call will continue with video, audio and text.

Figure 21:
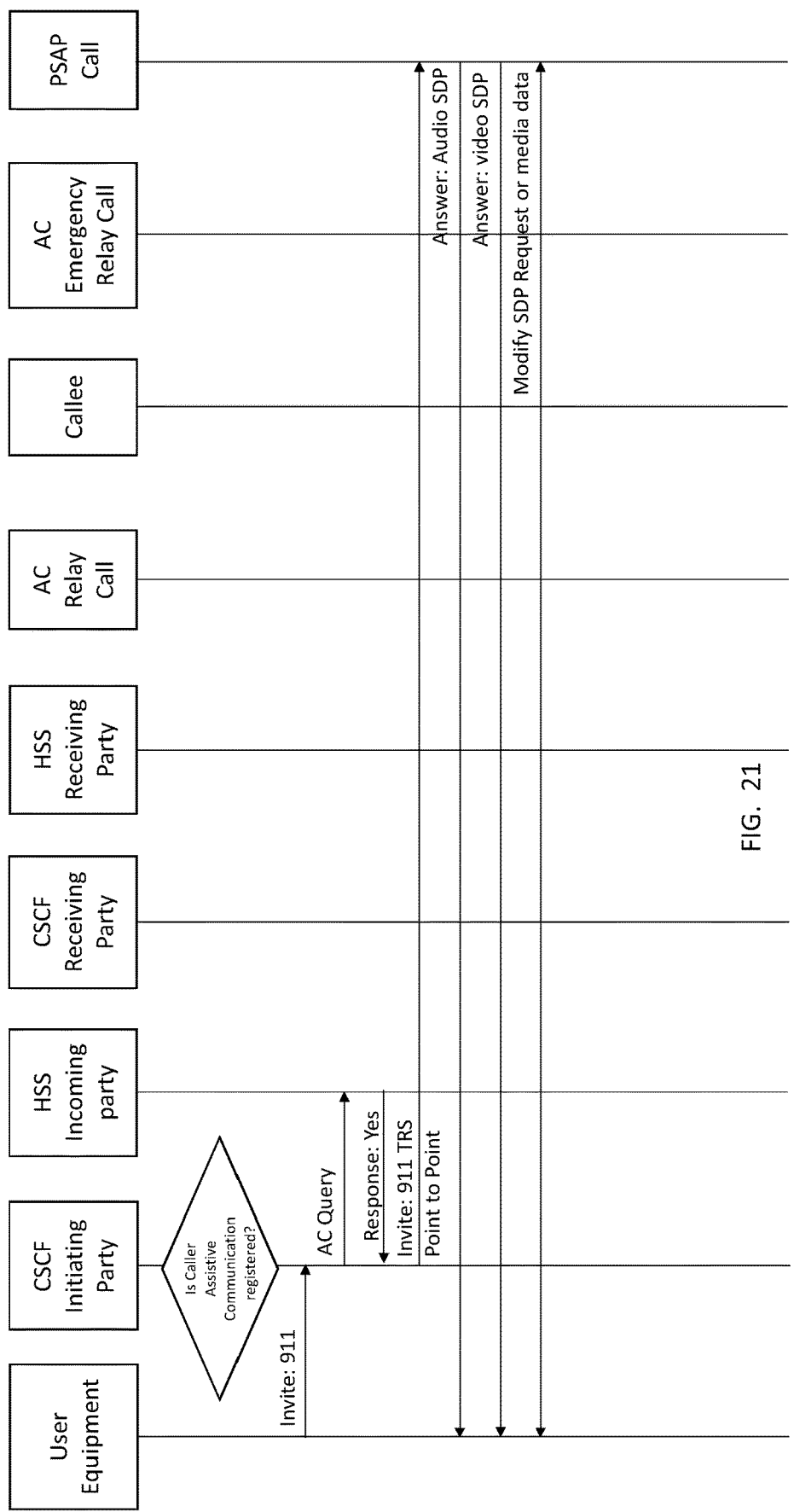
FIG. 21 is a flow chart showing an example of an IMS CSCF Point to Point Emergency protocol.

FIG. 21 illustrates an example of an IMS CSCF Point to Point Emergency. The initiating device will check if there are any communication attributes that are selected. The CSCF of the initiating party will check if the caller is a registered assistive communication user. If the initiating caller is registered and the PSAP has the ability to handle a direct TRS call, the point-to-point emergency TRS services are activated. The CSCF initiating party will connect directly to local emergency TRS-supported PSAP. The call will continue with video, audio and text.

The proposed methods will relieve the telecommunication provider dealing with interoperability challenges. This invention can be used to improve accessibility across all phone devices by allowing each device to become seamlessly accessible for deaf, hard of hearing, deaf-blind, and blind users. These improvements are used worldwide within phone operating system settings, carrier phone network settings, and in accessibility service-related settings. With these improvements to the network infrastructure, there now can be enhancements for inclusive development that produce better quality of service.

This invention is revolutionary in its core function of making every mobile device become accessible for deaf, hard of hearing, deaf-blind, and blind users; it allows more enhanced features and continuous native-operating system updates that are available from technology providers. The operating system updates like the phone dialer are intuitive to all users and allow for a more equitable experience.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. A method for enhancing communication between multiple parties, comprising:
    initiating by a first user a communication connection between an initiating device and a receiving device of a second user;
    a) creating a profile of the first user comprising the first user selecting a communication service from a stored list in the initiating device of universal communication services, each communication service containing a plurality of providers for that service and selecting one of the plurality of providers associated with the selected service providing specific functions of data that create a customized route from the first user to a server associated with the selected service provider,
    storing in the initiating device the selected service provider in the profile of the first user, and utilizing by a network the selected service provider in the profile of the first user by routing the communication connection based on the selected service, passing the profile of the first user through the network, reading the profile of the first user by a network database, directing a connection logic based on the profile, and determining an appropriate path to the selected service provider or point to point communication that corresponds with the selected service to complete the communication connection between the initiating and receiving communication devices; or
    b) creating a profile of the second user comprising the second user selecting at least one communication service from a stored list in the receiving device of universal communication services, each communication service containing a plurality of providers for that service and selecting one of the plurality of providers associated with the selected service providing specific functions of data that create a customized route from the second user to a server associated with the selected service provider,
    storing in the receiving device the selected service provider in the profile of the second user, and
    utilizing by a network the selected service provider in the profile of the second user by routing the communication connection based on the selected service, passing the profile of the first user through the network, reading the profile of the first user by a network database, directing a connection logic based on the profile, and determining an appropriate path to the selected service provider or point to point communication that corresponds with the selected service to complete the communication connection between the initiating and receiving communication devices; and
    passing the selected communication service on to a signaling server and passing certain profile data on to the second user.

2. The method of claim 1, wherein the initiating and receiving device comprises a mobile phone, smart home device, web browser, or an over-the-top application.

3. The method of claim 1, wherein the universal communication service comprises Video Relay Service (VRS), IP-CTS, Braille, Real Time Text (RTT), foreign language translation, or E911.

4. The method of claim 3, wherein initiating by the first user a communication connection to a receiving communication device of a second user for E911 services comprises connecting the first user to a PSAP operator, passing the E911 services on to the PSAP operator, connecting to a 911 Dispatcher on video relay call or direct video call agent, and optionally connecting the first user with one or more of the communication services.

5. The method of claim 1, wherein at least one of the first and second user is deaf, hard of hearing, deaf-blind, blind, or an individual with communication disabilities.

6. The method of claim 3, wherein at least one of the first and second users has foreign language translation services enabled from the universal communication services.

7. The method of claim 1, further comprising storing one or more universal communication services in a user's profile in a network database.

8. The method of claim 1, further comprising initiating a communication connection to multiple receiving communication devices.

9. The method of claim 1, wherein the communication connection comprises a unique identifier of the second user.

10. The method of claim 1, wherein utilizing one or more of the communication services comprises selecting a Telecommunications Relay Services comprising verifying eligibility of the Telecommunication Relay Services through a network database and passing the selected Telecommunications Relay Services from the device through a provider network.

11. The method of claim 3, wherein utilizing one or more of the communication services comprises:
- selecting IP-CTS captioning services on the communication device;
- routing the connection to the captioning services by utilizing text bridge logic to determine whether the first user is in need of accessible services through the attributes provided by a TRS database;
- connecting to a desired service provider; and
- viewing text data on the communication device transcribed by the service provider from the receiving communication device.

12. The method of claim 3, wherein utilizing the communication service comprises:
- selecting Video Relay Service (VRS);
- routing the communication connection to the VRS by utilizing communication logic to determine whether a second user is listed in a TRS database; and
- when the second user is listed in a TRS database or has dedicated hardware or a legacy device, connecting directly with the second user through a point to point connection or routing the connection with eligible TRS service(s) and passing appropriate universal attributes when the second user is not listed in a TRS database and
- communicating with the second user through the selected TRS service.

13. The method of claim 3, wherein a selected universal communication service is deaf-blind services by allowing the user to add in a braille reader and a screen reader while using one or more TRS services.

14. The method of claim 3, wherein connecting to foreign language translation services comprises:
- allowing the first user to choose a selected language; and
- allowing the first user to create at least one of a voice output and text output translated into another language.

* * * * *